United States Patent [19]

Fukushima et al.

[11] Patent Number: 5,051,849
[45] Date of Patent: Sep. 24, 1991

[54] RECORDING APPARATUS INCLUDING A PRE-RECORDING POSITIONING FUNCTION

[75] Inventors: Nobuo Fukushima; Masaya Maeda, both of Yokohama; Nobuo Tezuka, Kawasaki, all of Japan

[73] Assignee: Canon Kabushiki Kaisha, Tokyo, Japan

[21] Appl. No.: 633,173

[22] Filed: Dec. 28, 1990

Related U.S. Application Data

[63] Continuation of Ser. No. 930,752, Nov. 14, 1986, abandoned.

[30] Foreign Application Priority Data

Nov. 28, 1985 [JP] Japan .................. 60-267912
Nov. 28, 1985 [JP] Japan .................. 60-267913

[51] Int. Cl.$^5$ .................. G11B 19/02; G11B 21/02
[52] U.S. Cl. .................. 360/69; 360/72.1; 360/75; 360/78.04; 358/906; 369/233
[58] Field of Search .................. 360/55, 60, 69, 71, 360/75, 86, 96.5, 96.6, 105, 137, 72.1-72.3, 78.01, 78.02, 78.04, 78.08, 97.01, 97.04, 98.04-98.06, 99.01-99.03, 99.06, 99.07; 358/906, 909; 369/32, 33, 41, 233, 244

[56] References Cited

U.S. PATENT DOCUMENTS

| | | | |
|---|---|---|---|
| 3,588,375 | 6/1971 | Martin | 360/60 X |
| 3,872,509 | 3/1975 | Yoshii | 360/96.5 |
| 3,911,484 | 10/1975 | Mutou . | |
| 3,956,766 | 5/1976 | Hanson | 360/75 |
| 3,974,522 | 8/1976 | Fukatsu . | |
| 4,005,483 | 1/1977 | Kuwano . | |
| 4,009,331 | 2/1977 | Goldmark . | |
| 4,142,209 | 2/1979 | Hedlund . | |
| 4,163,263 | 7/1979 | Rotter . | |
| 4,229,808 | 10/1980 | Hui . | |
| 4,527,265 | 7/1985 | d'Alayer | 369/233 X |
| 4,542,427 | 9/1985 | Nagai | 360/72.1 |
| 4,563,715 | 1/1986 | Kawamura | 360/78 |
| 4,578,722 | 3/1986 | Lovgren | 360/60 |
| 4,594,701 | 6/1986 | Earman | 360/72.1 |

FOREIGN PATENT DOCUMENTS

| | | | |
|---|---|---|---|
| 54-140507 | 10/1979 | Japan | 360/78 |
| 55-089921 | 7/1980 | Japan . | |
| 57-064342 | 4/1982 | Japan . | |
| 58-114353 | 7/1983 | Japan . | |
| 58-189802 | 11/1983 | Japan . | |
| 59-065935 | 4/1984 | Japan . | |

Primary Examiner—Aristotelis M. Psitos
Assistant Examiner—Steven R. Garland
Attorney, Agent, or Firm—Fitzpatrick, Cella, Harper & Scinto

[57] ABSTRACT

A magnetic disc recording apparatus comprises a search mechanism for searching for an unrecorded position on the disc to properly continue the recording to the same disc and a head control mechanism for setting a recording head at the searched unrecorded position on the disc. The search mechanism operates when it is detected that the disc has been replaced or exchanged. The head control mechanism sets the head at a predetermined preparatory position for searching, corresponding to an extremity of a predetermined searching range of the search mechanism for searching for the unrecorded position when there is an indication that the disc has been unloaded.

59 Claims, 17 Drawing Sheets

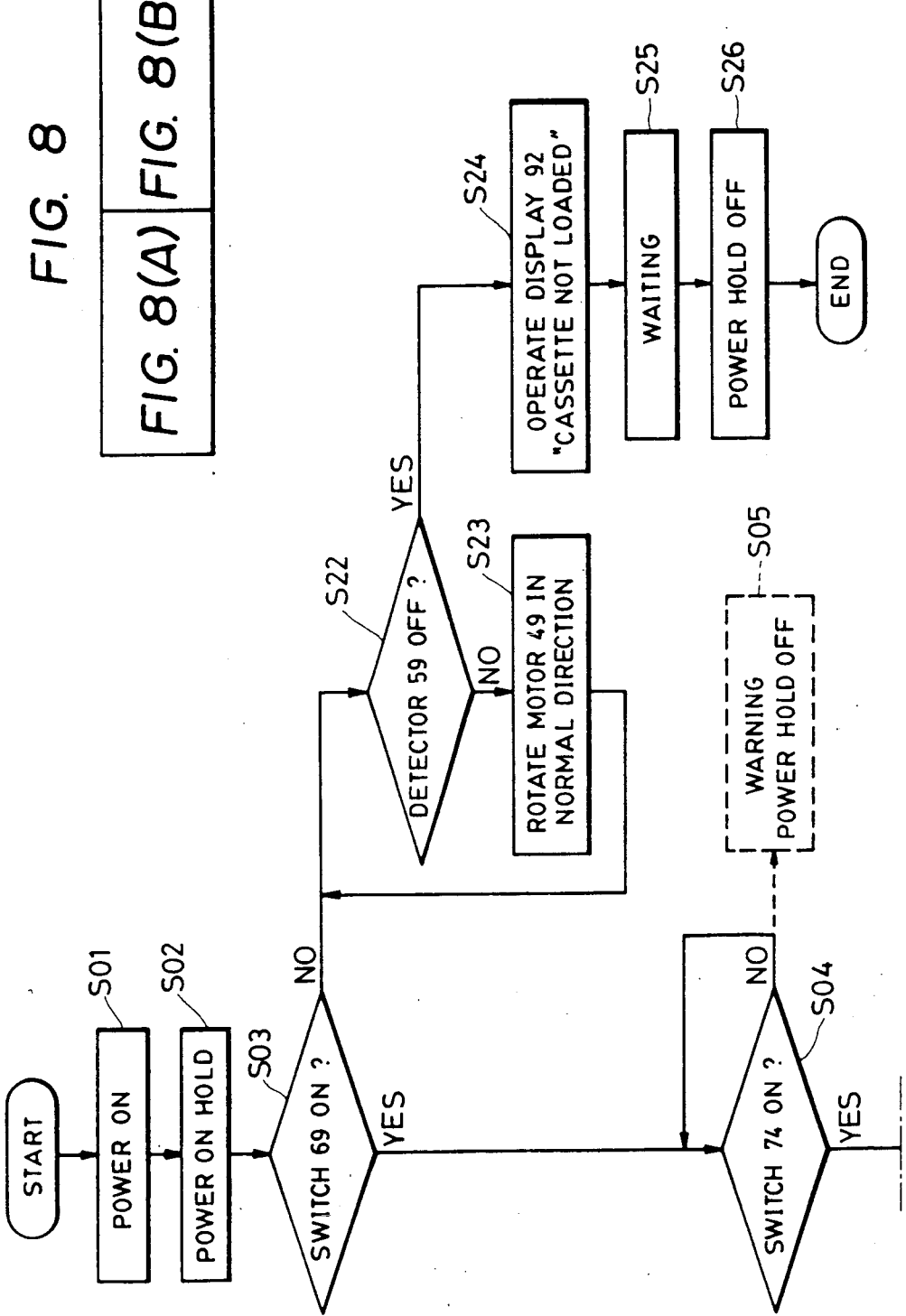

| FIG. 9(A) | FIG. 9(B) |

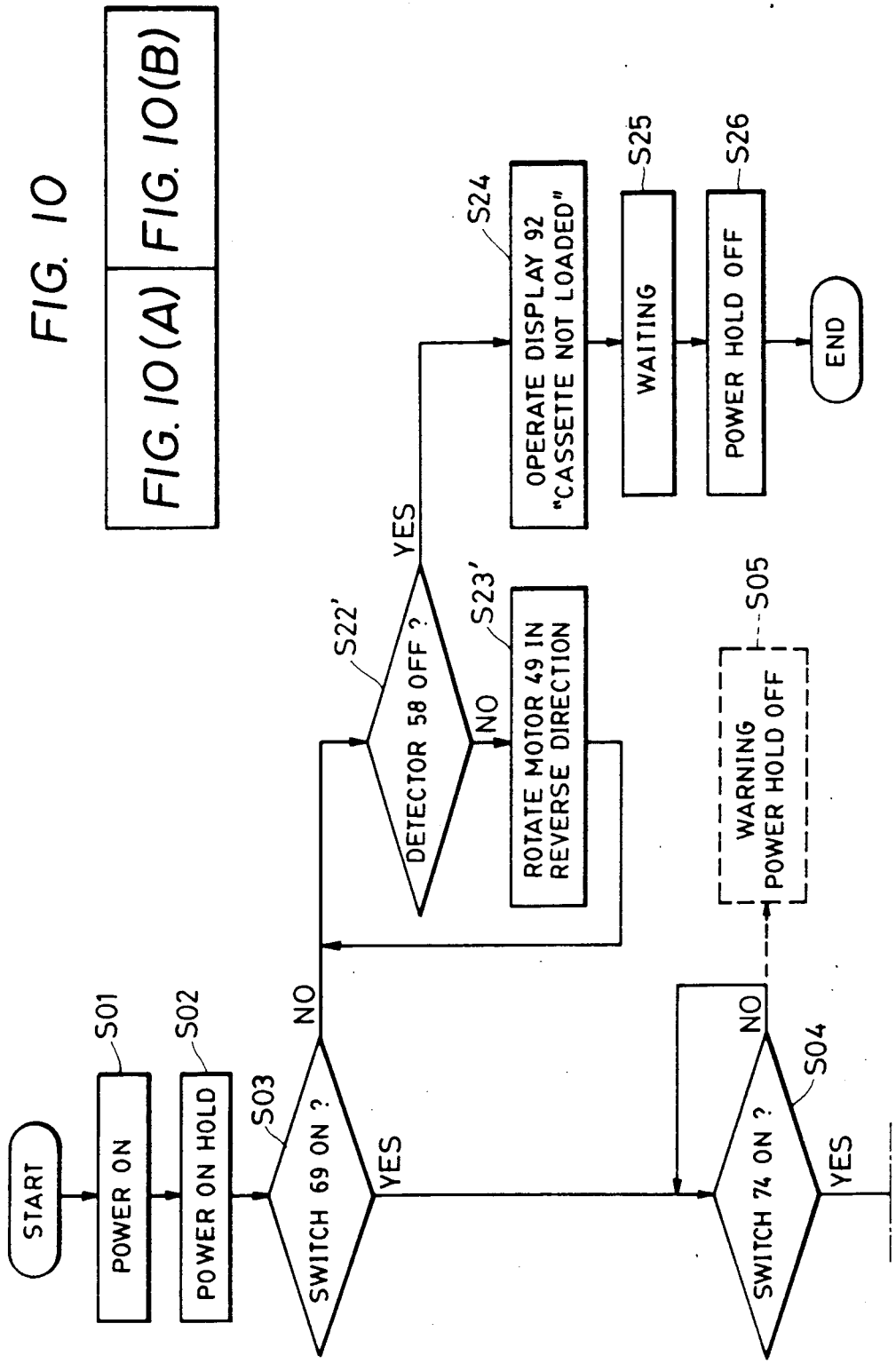

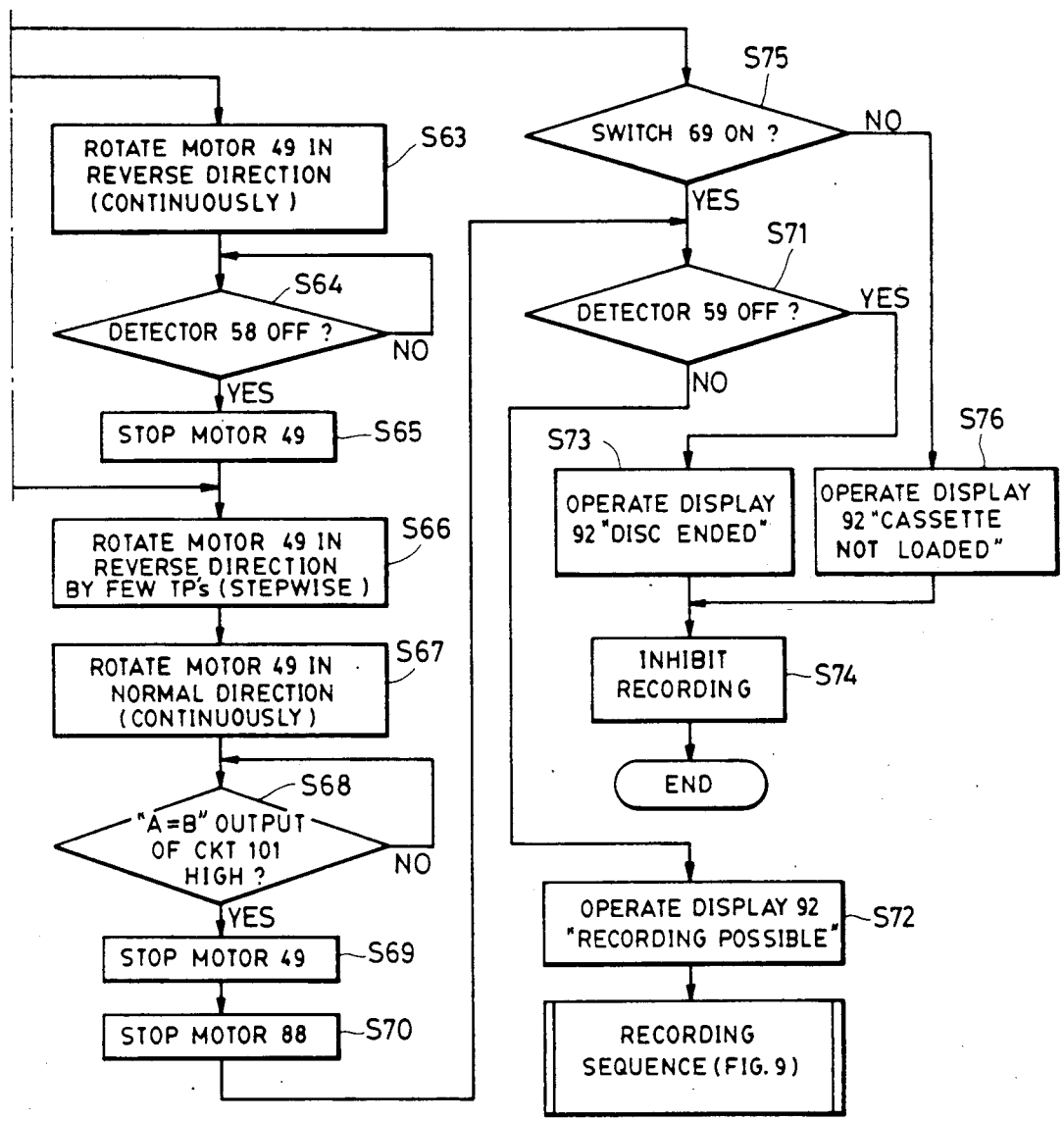

| FIG. 13 (A) | FIG. 13 (B) |

RECORDING APPARATUS INCLUDING A PRE-RECORDING POSITIONING FUNCTION

This application is a continuation of application Ser. No. 06/930,752, filed Nov. 14, 1986, now abandoned.

BACKGROUND OF THE INVENTION

1. Field of the Invention

The present invention relates to recording apparatus and more particularly to apparatus recording signals on an exchangeable record bearing medium.

2. Description of Related Art

In a recording apparatus of the kind, for example, using a rotary type record bearing medium such as a magnetic disc or drum and recording by a movable head with forming concentric circular or annular recording tracks on the medium, a unit length of information (such as one field or frame portion of a video signal or the like) in each recording track, it is necessary to properly position the head on an unrecorded or recordable part of the medium in advance of the recording if it is desired to record the information while avoiding double or overlapped recording.

With regard to the above, it has been proposed to provide a recording apparatus in which the head is positioned on the unrecorded or recordable part of the medium in advance of the recording by repeating the operation of checking as to whether or not there is a recording at the present recording position where the head is positioned; and by shifting the head to a next recording position if there is a recording at the present recording position. Thus, the recording is enabled only when the head becomes positioned at the unrecorded part of the medium that is, the recording start position on the medium. This technique is disclosed in, for example, U.S. Pat. No. 4,783,707, issued Nov. 8, 1988, assigned to the same assignee of the present application.

When the above described recording apparatus incorporates a control sequence arranged to include, for example, a process of shifting the head to a next recording position either upon completion of recording in one position or at the start of the recording process, the present position of the head on the medium serves as a memory of the next head recording position for the same medium. Therefore, even in cases where the power supply is cut off or where, in the event of a portable apparatus, the power source battery is taken out for replacement or for charging or where the battery voltage drops below a threshold value and becomes unserviceable, it is nevertheless possible to continue proper recording on the same recording medium based on the present head position when the power supply is again switched on or has recovered its voltage, unless in the meantime the head has become shifted to some other position. Such a proper recording position control prevents overlapped recording as well as unwanted unrecorded areas (blank tracks) on the record bearing medium.

However if the record bearing medium is replaced with another medium while the power supply is cut off as mentioned above, the present head position becomes meaningless and is no longer usable as a memory for the new medium. In such case, resumption of recording under this condition results either in overlapped recording or in blank recording tracks. To avoid such problem, the above-stated process of positioning the head for an unrecorded part on the record bearing medium must be carried out every time the power supply is switched on. However, if the record bearing medium has not been replaced, this method is irrational. Besides, this method deprives the apparatus of the ability to obtain prompt recording under all conditions. Further, in the event of a portable apparatus, this method presents a serious problem as it increases the consumption of the power supply battery.

Problems similar to the above are likely to occur also in other types of recording apparatus, such as those which select the recording head according to the properties or kind of the record bearing medium.

In view of the above, there has already been proposed a recording apparatus which comprises memory means to mechanically store recording head position information whenever the recording medium is replaced. In that proposed apparatus, it is possible to mechanically store the information when the recording medium is replaced and to control the repositioning of the head to an unrecorded part of the medium based on the information stored in the memory means so that the head is repositioned only when the recording medium has been exchanged, i.e. replaced. For note, the above-mentioned device is described in Japanese Patent Application No. Sho 60-22633 (U.S. counterpart: U.S. Ser. No. 090,422, filed Aug. 26, 1987, a continuation of application Ser. No. 826,117, Feb. 5, 1986, "Recording or reproducing apparatus", Fukushima et al.) of the same assignee of the present application. Also a head positioning method and recording or reproducing apparatus in which searching is carried out in a direction from the periphery toward the center of the disk is shown and described in Japanese Patent Application No. Sho. 60-22634 (U.S. counterpart: Ser. No. 826,498, filed Feb. 5, 1986, "Head Positioning Method And Recording On Reproducing Apparatus Employing Same", Fukushima et al.).

SUMMARY OF THE INVENTION

The present invention is generally in the nature of the improvement of the invention described in the above-mentioned prior application.

According to a first aspect of the invention there is provided a holder for an exchangeable recording medium, a transducing head arranged in transducing relationship with a recording medium held by the holder, search means to produce relative movement between the head and a recording medium held by the holder to bring together the head and a recorded position on the medium, a detector for detecting the unloading or removal of a recording medium, a memory and a control means. The memory is constructed to maintain, independently of application of power thereto, an indication of unloading of a recording medium. The control means is operative, during the application of power thereto, to place the search means in a beginning of search condition in response to detection of unloading by the detector and to place the search means in a beginning of search condition in response to an indication from the memory.

As is embodied in a preferred embodiment, the control means includes a detection circuit for detecting a recordable position on the medium; and is arranged to control the search means so that the head means and the recordable position on the medium are aligned with each other when the output of the memory means indicates that the medium has been replaced. The search means is arranged to move the head means relative to the medium. The control means is further arranged to control the search means so that the head means is placed at a predetermined position when the output of the detection means indicates that the recording medium has been removed from the apparatus. The above mentioned predetermined position may be a preparatory position for searching for the recordable position on the medium. The apparatus further comprises reset means for resetting the memory means. The reset means can be arranged to reset the memory means in response to the operation of the search means. The memory means is arranged to mechanically store the information and the reset means is arranged to mechanically reset the memory means. The detection means is operatively associated with the memory means.

According to a second aspect of the invention there is provided a holder for an exchangeable recording medium, a transducing head arranged in transducing relationship with a recording medium held by the holder, drive means to produce relative movement between the head and a recording medium held by the holder to bring together the head and a recorded position on the medium, a detector for detecting the unloading or removal of a recording medium, a memory and a control means. The memory is constructed to maintain, independently of application of power thereto, an indication of unloading of a recording medium. The control means is operative, during the application of power thereto, to cause the drive means to relatively position the head means and the recording medium at predetermined relative positions in response to detection of unloading by the detector and to cause the drive means to relatively position the head means and the recording medium at the predetermined relative position in response to an indication from the memory.

As is embodied in a preferred embodiment, the apparatus includes search means for searching for a recordable position on the medium; and the control means is arranged to cause the drive means to place the head means at the recordable position searched by the search means when the output of the memory means indicates that the medium has been replaced. The control means is further arranged to cause the drive means to place the head means at a preparatory position for searching for the recordable position by the search means when the output of the detection means indicates that the medium has been removed. The above-mentioned preparatory position can be a position corresponding to an extremity of a searching range on the recording medium. The control means can further be arranged to cause the search means to search from one extremity toward the opposite extremity of the recording medium for the recording position. The search means is arranged in conjunction with the drive means to move the head means from the one extremity toward the other extremity and to determine the recordable position based on an output of the head means. The apparatus of the preferred embodiment further comprises reset means explained in connection with the above-mentioned first aspect.

By the feature of the above-mentioned first or second aspect of the present invention, it becomes possible to promptly find a recordable position on the medium through quick searching whenever the medium is replaced.

According to a third aspect of the present invention, there is provided a signal recording apparatus which comprises search means, first memory means, second memory means, control means and reset means. The search means searches for a recordable position on a record bearing medium. The first memory means stores information representing the recordable position searched by the search means. The second memory means stores information regarding an exchange or replacement of the medium. The control means is responsive to the information stored in the second memory means to control operation of the search means. The reset means resets the second memory means after the first memory means stores the information on the searched recordable position.

As is embodied in a preferred embodiment, the control means is arranged to use the search means to search for the recordable position on the medium from one extremity toward the opposite extremity of a searching range along a predetermined direction when the information stored in the second memory means indicates that the medium has been replaced. The first memory means is arranged to store information representing the recordable position as a result of the searching by the search means. The reset means is arranged to reset the second memory means after the completion of the searching by the search means. The reset means is arranged to reset the second memory means in response to the operation of the search means. The reset means is arranged to reset the second memory means in response to the operation of the search means beyond the other extremity of the searching range. The second memory means is arranged to mechanically store the information and the reset means is arranged to mechanically reset the second memory means. The apparatus of a preferred embodiment further comprises signal transducing head means positionable at each recording position on the medium and the search means is arranged to search for the recordable position based on the output of the head means. The search means includes a discrimination circuit for discriminating whether or not a signal is recorded based on the output of the head means.

According to a fourth aspect of the present invention, there is provided a signal recording apparatus which comprises movable head means, head moving means, detection means, first memory means, second memory means, control means and reset means. The head moving means moves the head means along a recording surface of a record bearing medium. The detection means detects a recordable position on the medium. The first memory means stores information representing the recordable position detected by the detection means. The second memory means stores the information regarding an exchange or replacement of the medium. The control means controls the operation of at least one of the moving means and the detection means based on the information stored in the second memory means. The reset means resets the second memory means after the first memory means stores the information on the detected recordable position.

As is embodied in a preferred embodiment, the control means is arranged to cause the moving means to move the head means from one toward another extremity of a detection range for the detection of the recordable position by the detection means when the information stored in the second memory means indicates that the medium has been replaced or exchanged. The control means is further be arranged to cause the detection means to operate when the moving means moves the head means from the one toward the other extremity of the detection range. The detection means is arranged to detect the recordable position based on an output of the head means.

The detection means includes a discrimination circuit for discriminating whether a signal is recorded based on the output of the head means. The first memory means is arranged to store the information on the recordable position as a result of the detection by the detection means. The reset means is arranged to reset the second memory mean after completion of the detection by the detection means. The reset means is also arranged to reset the second memory means when the moving means moves the head means beyond the other extremity of the detection range. The second memory means is arranged to mechanically store the information and the reset means is arranged to mechanically reset the second memory means.

By the feature of the above-mentioned third or fourth aspect of the present invention, it becomes possible to properly set the recording head means at the recordable position on the medium with the highest possible safety against a possible trouble in the electrical power supply.

The above and other aspects, features and advantages will become apparent from the following detailed explanation of the preferred embodiments of the present invention referring to the accompanying drawings.

BRIEF DESCRIPTION OF THE DRAWINGS

FIG. 8, comprising FIGS. 8(A) and 8(B), shows a flow chart showing the control flow in the control arrangement of FIG. 7 in preparation for recording;

FIG. 10, comprising FIGS. 10(A) and 10(B), shows a flow chart showing the control flow in preparation for recording in a modification of the arrangement of FIG. 7;

FIG. 12, comprising FIGS. 12(A) and 12(B), shows a flow chart showing the control flow in the control arrangement of FIG. 11 in preparation for recording; FIGS. 13(A) and 13(B), shows a flow chart showing the control flow in preparation for recording in a modification of the embodiment of FIG. 11.

DETAILED DESCRIPTION OF THE PREFERRED EMBODIMENT

Figure 1:
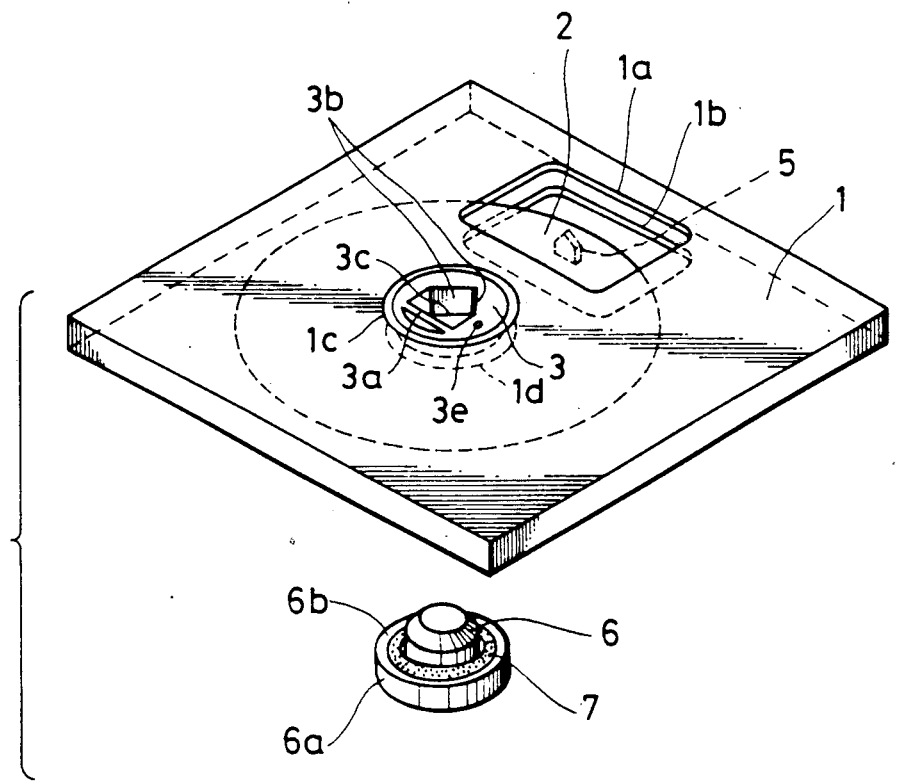
FIG. 1 is an exploded perspective view showing a cassette containing a record bearing medium for use in the present invention, as well as a spindle for driving the medium in the cassette.

First, referring to FIG. 1, an example of a record bearing medium used in an embodiment of the present invention is explained herein below.

A cassette 1 is constructed to house a record bearing medium, such as a flexible rotary magnetic disc 2, for rotary movement therein. The magnetic disc 2, which is employed as a record bearing medium, is provided at its center with a synthetic resin center core 3 which serves as a mount part. As shown in FIGS. 3B and 3C, a magnetizable plate 3d is secured to the lower surface of the center core 3. A magnetizable pin 3e (FIGS. 1, 3B and 3C) is erected on the magnetizable plate 3d to pierce the center core 3. The cassette 1 is provided with upper and lower apertures 1a and 1b (FIG. 1) which are respectively arranged to permit insertion of stabilizing plates 37 and 15 (FIG. 2) for stabilizing the rotation of the magnetic disc 2. A recording magnetic head 5 (FIG. 2) is arranged to project through the lower aperture 1b either into contact with or close to the recording surface of the magnetic disc 2. The center core 3 is arranged to be mounted on a spindle 6 which is arranged on the side of the apparatus for rotational driving of the magnetic disc 2. An engaging hole 3c (FIG. 1) is provided in the center core 3 for this purpose. The engaging hole 3c is formed with slanting side faces 3b and a spring engaging face 3a. The spring engaging face 3a is arranged to push the spindle 6 against the slanting side faces 3b. A permanent magnet 7 is arranged in a flange 6a of the spindle 6 at a position to correspond to a magnetizable plate 3d (FIGS. 3B and 3C) disposed on the lower surface of the center core 3. When the center core 3 is mounted on the spindle 6, the magnetizable plate 3d is pulled by the permanent magnet 7 which provides a magnetic chucking effect. The lower surface of the center core 3 thus comes to abut a flange surface 6b of the flange part 6a of the spindle 6; and the height of the magnetic disc 2 is thereby defined relative to the head 5. The cassette 1 is provided further with upper and lower apertures 1c and 1d which are arranged to accommodate the center core 3.

An embodiment of the present invention, which uses the magnetic disc cassette described above, will now be described.

Figure 2:
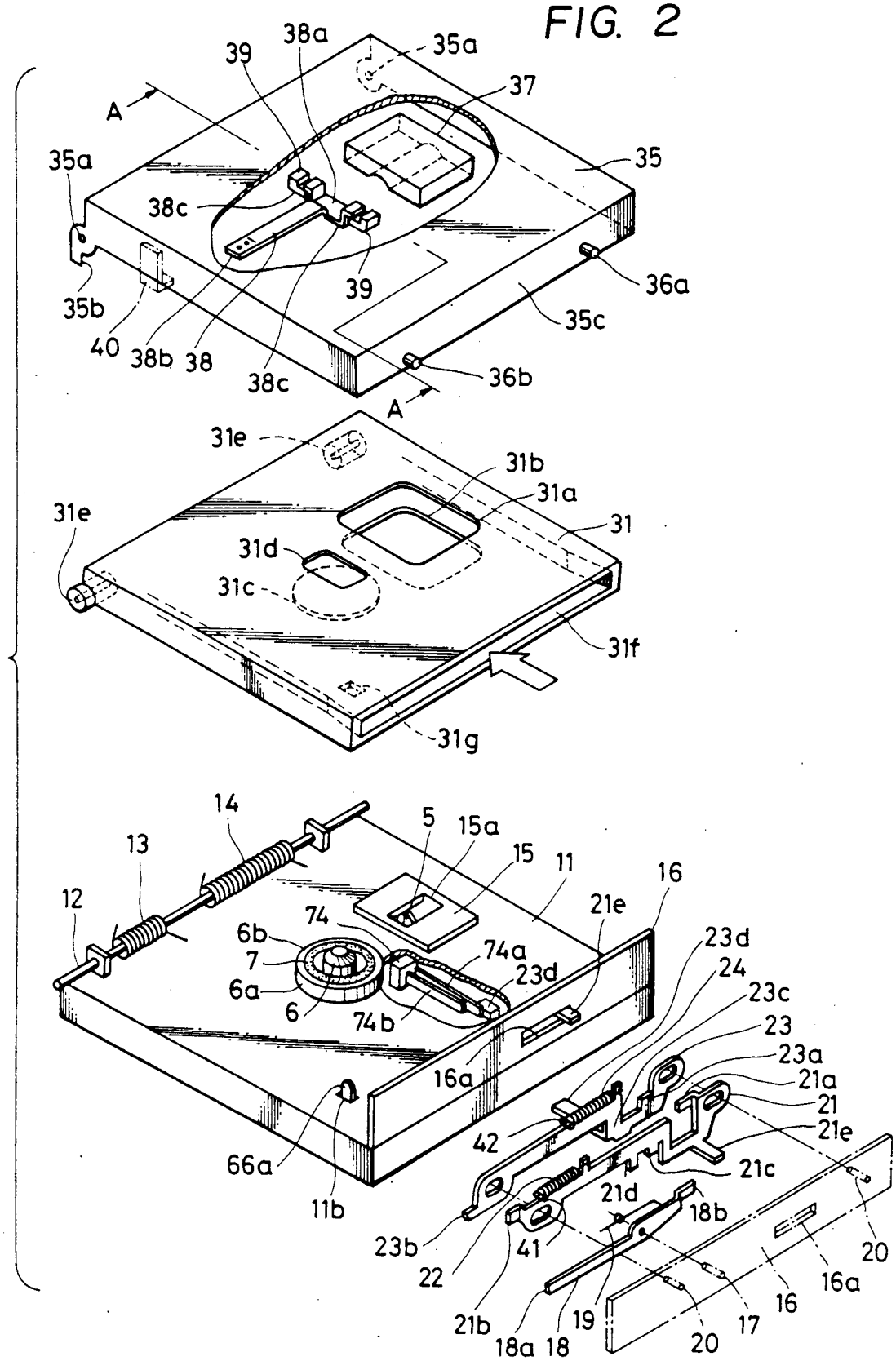
FIG. 2 is an exploded perspective view showing a cassette holding and disk driving arrangement according to the present invention.

As shown in FIG. 2, a recording apparatus which embodies this invention is provided with a body chassis 11. The spindle 6 and the head 5 are arranged on the chassis 11 for rotational and translational movement respectively. A hinge shaft 12 is arranged on the chassis 11. A side plate 16 which is also disposed on the chassis 11 is provided with a shaft 17. On the shaft 17 is provided a clamp lever 18 which is under a clockwise urging force of a spring 19. A pair of pins 20 are erected on the side plate 16. Two slidable lock levers 21 and 23 are arranged to be guided by these pins 20 under leftward (as viewed on the drawing) urging forces of springs 22 and 24. Further, pins 41 and 42 are also erected on the side plate 16 and are arranged to retain the ends of the springs 22 and 24 respectively.

A cassette holder 31 is arranged to receive the cassette 1. The holder 31 is pivotally mounted on the chassis 11 by engaging the hinge shaft 12 at its hinge parts 31e. The holder 31 is provided with a side slot 31f which is arranged to receive the cassette 1. The cassette 1 is thus insertable through this slot 31f. The holder 31 is also provided with apertures 31a and 31b which are respectively arranged to permit the stabilizing plates 37 and 15 to enter the holder 31. The holder 31 is further provided with apertures 31c and 31d which are respectively arranged to allow the spindle 6 and a protrudent part 38a of a leaf spring 38 for pushing the center core 3 of the disc 2 to enter the holder 31. A cassette sensing piece 66a of a cassette loading-and-unloading detection lever 66 (see FIG. 5) is arranged to enter the holder 31 through a hole 11b of the chassis 11 and another aperture 31g provided in the lower side of the cassette holder 31.

An outer cover 35 is pivotally mounted on the chassis 11 by engaging at its hinge parts 35a with the hinge shaft 12. Lock pins 36a and 36b are mounted on a front side surface 35c of the outer cover 35. A hook member 40 is provided on the outer cover 35 for the holder 31. The upper stabilizing plate 37 is attached to the upper inside surface of the outer cover 35. This upper stabilizing plate 37 and the lower stabilizing plate 15, which is disposed on the chassis 11, cooperate to sandwich the magnetic disc 2 and thus prevent vibration and deformation of the disk as it rotates. The stabilizing plates 37 and 15 are so arranged that a suitable layer of air is formed between the magnetic disc 2 and each of the plates. The head 5 is arranged to protrude through an aperture 15a provided in the middle part of the lower stabilizing plate 15. The T-shaped leaf spring 38 is arranged to have its tail end 38b secured by screws to the upper inside surface of the outer cover 35. A fore end part 38a of the leaf spring 38 is formed to protrude downward as shown in the drawing. Edge parts 38c on two sides of the leaf spring 38 are restricted against the resilience of the leaf spring 38 by position restricting members 39 which are secured to the upper inside surface of the outer cover 35. The protrudent part 38a of the leaf spring 38 is thus arranged to come to the upper part of the spindle 6 under an initial force developed with the edge parts 38c thus restricted in position by the position restricting members 39. A spring 13 which is disposed on the hinge shaft 12 has its arm parts abutting on the holder 31 and the outer cover 35 and is thus arranged to impart turning forces to them in the direction of unfolding from each other. Another spring 14 which is also disposed on the hinge shaft 12 has its arm parts abutting on the chassis 11 and the outer cover 35. With the spring 14 arranged in this manner a counterclockwise turning force is exerted on the outer cover 35.

As shown in FIG. 2, a normally open type outer cover lock completion detecting switch 74 is provided on the chassis 11. Under a condition shown in FIGS. 3C and 4C, one contact piece 74a of the switch 74 is pushed by a switch control arm 23d of the lock lever 23 and is thus brought into contact with another contact piece 74b of the switch 74.

Next, referring to FIG. 5, memory means which is arranged to mechanically memorize an occurrence of the exchange or replacement (loading and unloading) of the cassette 1 is explained hereinbelow. A lever pivot member 61 is secured to the under side of the upper wall of the body chassis 11. A switch operating lever 62 is pivotally carried by the shaft part 61a of the pivot member 61 and is arranged to rotate and rock on the shaft 61a. The lever 62 is provided with a switch operating part 62a which is formed with the fore end part of the lever 62 bent upward to have the part 62a located above a contact piece 70a of a switch 70 in its neutral position. A spring 63 is arranged to urge the lever 62 to turn counterclockwise as viewed on the drawing and to keep the lever 62 in its neutral position. The spring 63 is wound round the shaft part 61a of the carrying member 61 and has its two ends hung on the lever 62 and a fixed pin 65. The pin 65 is arranged such that, with a tail end 62b of the lever 62 received by the pin 65, the counterclockwise rotation of the lever 62 is limited to a point at which the switch operating part 62a comes to be just above the contact piece 70a of the switch 70. A retainer member 64 is arranged to prevent the spring 63 and the lever 62 from pulling out from the shaft part 61a of the carrying member 61.

The cassette loading and unloading detection lever 66 is L-shaped and is provided with the cassette sensing piece 66a at the fore end thereof. The lever 66 is pivotally carried by a shaft 67 to rotate thereon. A spring 68 is arranged to urge the lever 66 to turn in the direction of having the cassette sensing piece 66a come to protrude toward the holder 31 through the hole 11b in the chassis 11. The lever 66 is further provided with a downwardly extending shoulder 66b which is arranged to receive an arm part 62c of the switch operating lever 62; a pushing down part 66c for pushing down the arm part 62c; and a switch operating part 66d which is arranged to push down a contact piece 69a of a switch 69.

The switch 69 is of the normally closed type and is arranged to detect the presence or absence of the cassette 1 in the holder 31. In case the apparatus is not loaded with the cassette 1, the cassette loading-and-unloading detection lever 66 is turned counterclockwise by the force of the spring 68. This causes the switch operating part 66d of the lever 66 to push the contact piece 69a of the switch 69 and move it away from the other contact piece 69b of the switch 69. This in turn causes the switch 69 to open or turn off. On the other hand, when the apparatus is in a state of being loaded with the cassette 1, the sensing piece 66a of the lever 66 is pushed by the lower surface of the cassette 1 to turn clockwise. This allows the normally closed contact pieces 69a and 69b to come into contact with each other and thus causes the switch 69 to turn on.

The cassette loading-and-unloading detection switch 70, which is of the normally open type, is arranged to close or turn on when the switch operating part 62a of the switch operating lever 62 pushes down the contact piece 70a of the switch 70 to bring it into contact with the other contact piece 70b of the switch. A gear 71 is arranged to rotate in relation to a shift of the head 5 caused by a head shifting device which will be described hereinafter. The gear 71 is rotatably carried by a shaft 72. A reset lever 73 is attached to the gear 71. When the head 5 is shifted by the head shifting device to a point located outside of a given recording region on the magnetic disc 2 (whatever the location may be, in the inner (central) region or the outer (peripheral) region of the disc 2), a bent up part 73a of the reset lever 73 pushes the tail end 62b of the switch operation lever 62 to move clockwise against the force of the spring 63. This causes the arm part 62c of the lever 62 to move away from the pushing-down part 66c of the cassette loading-and-unloading detection lever 66.

Figure 3A:
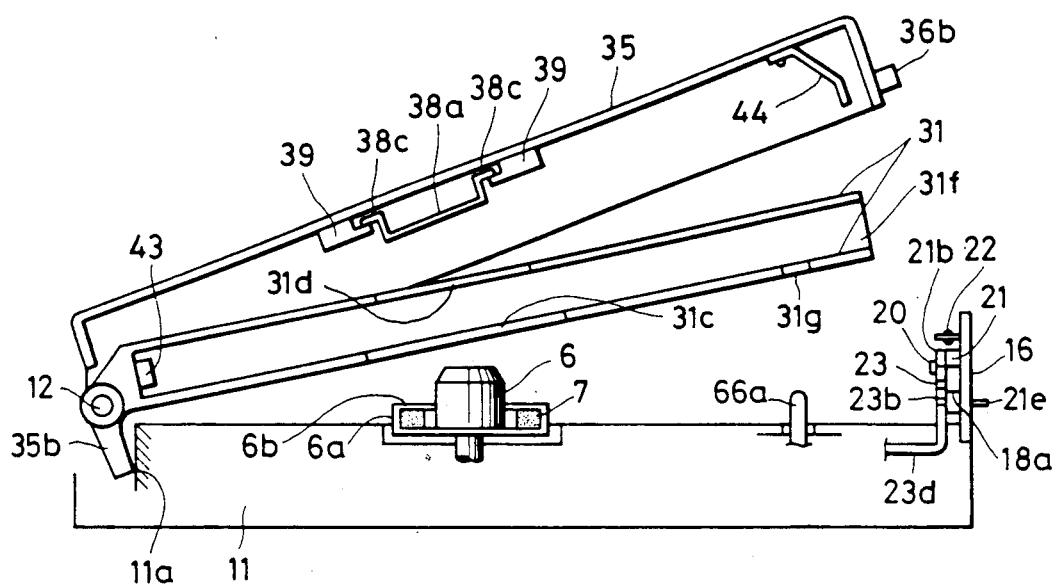
FIGS. 3A, 3B and 3C are sectional views taken along the line A—A of FIG. 2 and showing the arrangement of FIG. 2 in different conditions.
Figure 3B:
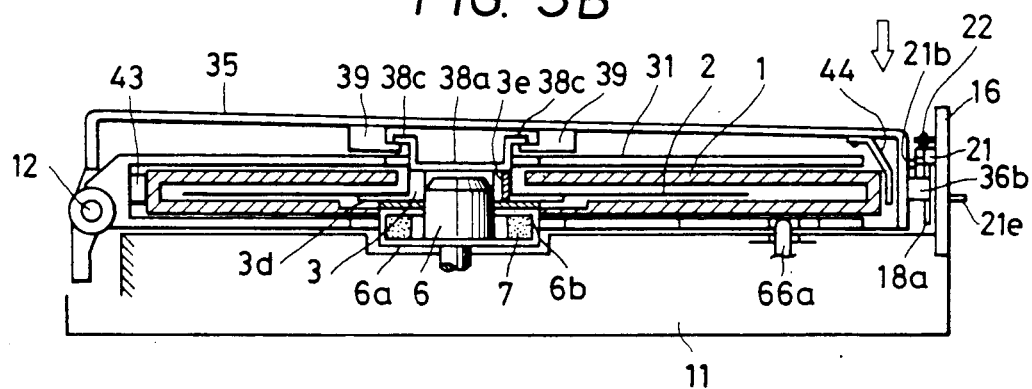
Figure 3C:
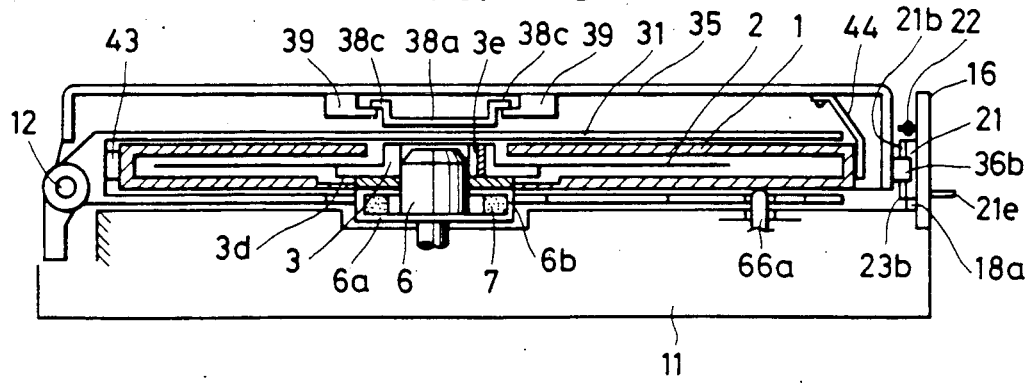
Figure 4A:
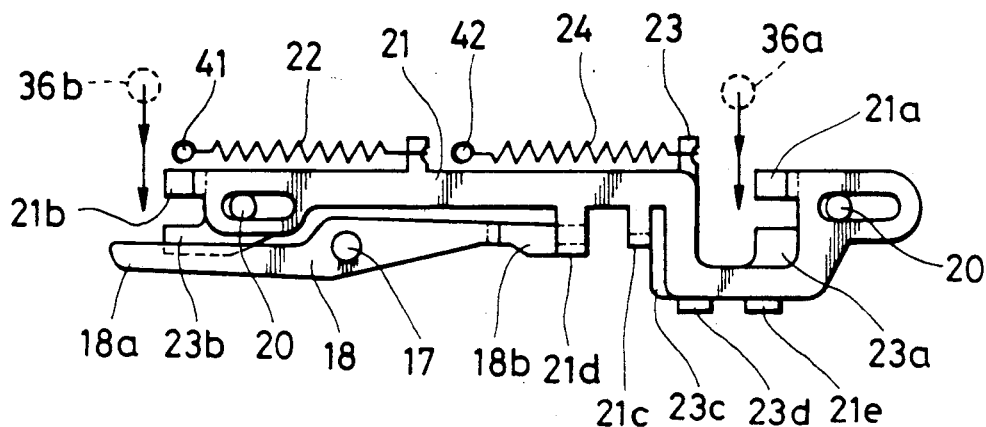
FIGS. 4A, 4B and 4C are elevational views showing the details of a cover lock part of the arrangement of FIG. 2 in its different conditions.

With the embodiment arranged as described above, in loading the apparatus with the cassette 1, the outer cover 35 is turned counterclockwise relative to the chassis 11 on the hinge shaft 12 by the urging force of the spring 14 as shown in FIG. 3A until one end 35b of the outer cover 35 comes to abut on a chassis wall 11a. In this instance, the urging force of the spring 13 tries to turn the holder 31 clockwise relative to the outer cover 35. However, the hook member 40 which is provided on the outer cover 35 serves to retain the holder 31 in the position as shown in FIG. 3A. Under this condition, the outer cover 35 and the holder 31 are in an open state as shown in FIG. 3A. Referring to FIG. 4A, in this opened condition, the hook part 18b of the clamp lever 18 and the claw part 21d of the lock lever 21 are in engagement with each other. Also, the bent part 21c of the lock lever 21 abuts one end 23c of the lock lever 23. Accordingly, the two lock levers 21 and 23 are held in a right shifted position against the force of the springs 22 and 24. In this condition, the claw parts 21a and 23a and other claw parts 21b and 23b of the lock levers 21 and 23 are located outside of the moving loci of lock pins 36a and 36b provided on the outer cover 35. Further, under this condition, the contact pieces 74a and 74b of the lock completion detecting switch 74 are out of contact with each other.

Further, referring again to FIG. 5, the cassette loading-and-unloading detection lever 66 is, in this condition, in a state of having been turned counterclockwise by the force of the spring 68. Therefore, the switch operating lever 62 is released from the restriction imposed by the shoulder 66b of the detection lever 66. This allows the spring 63 to turn the lever 62 counterclockwise until the tail 62b of the lever 62 comes to abut the pin 65. The switch operating lever 62 is thus brought into a state in which the switch operating part 62a thereof is located exactly above the contact piece 70a of the cassette loading-and-unloading detection switch 70. Further, the cassette presence-or-absence detection switch 69 has its contact pieces 69a and 69b out of contact from each other with the contact piece 69a having been pushed down by the switch operating part 66d of the detection lever 66.

Again referring to FIG. 3A, when the cassette 1 is inserted into the holder 31 via the slot 31f under the condition shown and then the outer cover 35 is turned clockwise on the hinge shaft 12 against the urging force of the spring 14, the holder 31 is also turned in the same direction on the hinge shaft 12. Under a cassette-and-disc loading completed condition as shown in FIG. 3C, the spindle 6 comes into the engaging hole 3c of the center core 3 of the magnetic disc 2 via the aperture 31c of the holder 31. The lower stabilizing plate 15 and the upper stabilizing plate 37 also respectively come into the apertures 1b and 1a via the apertures 31b and 31a of the holder 31. Then, under that condition, when the outer cover 35 is pushed in further in the direction of the arrow shown in FIG. 3B from the cassette-and-disc loading completed position which is as shown in FIG. 3C, the protruding fore end part 38a of the leaf spring 38, which is provided on the outer cover 35, urges the center core 3 of the magnetic disc 2 toward the spindle 6. The lower surface of the center core 3 thus comes to abut the flange surface 6b of the flange part 6a of the spindle 6. In this case, any quantitative difference between the pushing stroke obtained when closing the outer cover 35 and the amount by which the center core 3 has to be pushed is accommodated by the flexure of the leaf spring 38.

With the cassette 1 inserted into the holder 31, as shown in FIGS. 3B and 3C, the cassette sensing piece 66a of the cassette loading-and-unloading detection lever 66 is under the pressure of the lower surface of the cassette 1. This causes the lever 66 to be moved clockwise against the force of the spring 68. Then, the pushing down part 66c of the lever 66 pushes the arm part 62c of the switch operating lever 62. In response to this, the switch operation part 62a of the operating lever 62 pushes the contact piece 70a of the cassette loading-and-unloading detection switch 70. The contact piece 70a is thus brought into contact with the contact piece 70b and thus the switch 70 turns on. Further, the normally closed cassette presence-or-absence detection switch 69 is then released from the pushing operation of the switch operation part 66d of the detection lever 66 on its contact piece 69a. Therefore, the switch 69 closes or turns on.

In case that the cassette 1 is not inserted into the holder 31, the detection lever 66 is not turned clockwise. Therefore, both the switches 69 and 70 remain open.

As will be understood from the foregoing description, in this embodiment, removal of the cassette 1 is memorized by the shift of the position of the switch operating lever 62 to a position where the arm part 62c of the lever 62 turns counterclockwise until it comes beneath the pushing-down part 66c of the cassette loading-and-unloading detection lever 66. Then, the memorized information representing the cassette exchange or removal is obtained in the form of turning on, i.e. closing of the cassette loading-and-unloading detection switch 70 which takes place when the holder 31 loaded with the cassette 1 is pushed down in that state together with the outer cover 35 to obtain the condition of FIGS. 3B or 3C.

Figure 4B:
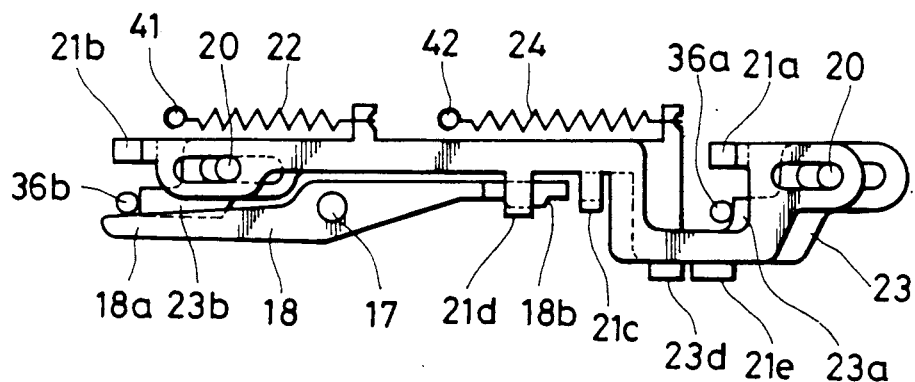
Figure 4C:
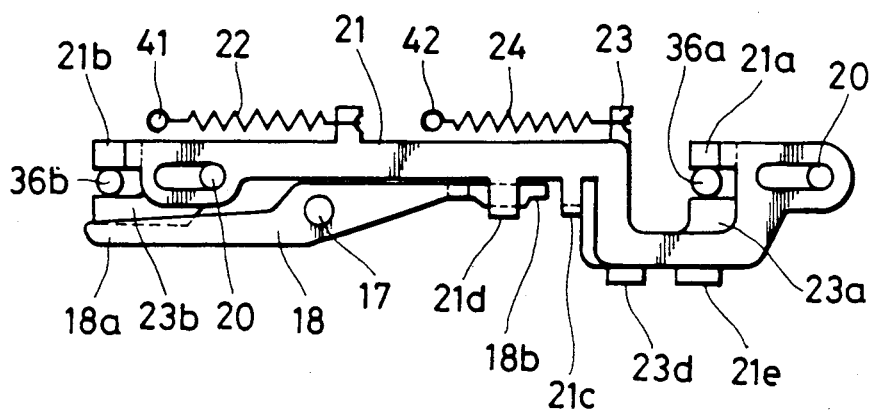

When the outer cover 35 is pushed in as shown in FIG. 3B, the pin 36b, which is mounted on the outer cover 35 in pair with the lock pin 36a, comes to push the tail end 18a of the clamp lever 18. This causes the lever 18 to turn counterclockwise on the shaft 17 against the force of the spring 19. Accordingly, the hook part 18b of the lever 18 is disengaged from the claw part 21d of the lock lever 21. The disengagement allows the lock lever 21 to be moved leftward by the urging force of the spring 22 as shown in FIG. 4B. Then the claw parts 21a and 21b of the lock lever 21 are respectively positioned above the lock pins 36a and 36b. On the other hand, the side end part of the claw part 23a or 23b of the lock lever 23 then comes to abut sidewise on the lock pin 36a or 36b and thus the lock lever 23 is prevented from moving leftward against the force of the spring 24 while the other lock lever 21 is moving. After that, when the outer cover 35 is freed from the pushing-in operation, the urging force of the spring 14 tries to move the outer cover 35 counterclockwise on the hinge shaft 12. However, this is blocked by the engagement of the lock pins 36a and 36b with the claw parts 21a and 21b of the lock lever 21. Further, the lock lever 23 is then caused by the urging force of the spring 24 to move to the left until its movement is restricted by the bent part 21c of the lock lever 21. The claw parts 23a and 23b then come to engage the lock pins 36a and 36b as shown in FIG. 4C. At this time, the outer cover 35 is secured to the body chassis 11. Under this condition, the switch control arm 23d of the lock lever 23 brings the contact piece 74a of the lock completion detecting switch 74 into contact with the other contact piece 74b to turn on the switch 74. The fore end protrudent part 38a of the leaf spring 38 which is attached to the outer cover 35 comes out of contact with the center core 3. The magnetic disc 2 is thus adequately mounted on the spindle 6 and can be rotated in this state by the rotation of the spindle 6.

In removing the cassette 1 from the holder 31, the bent part 21e of the lock lever 21, which is protruding from a slot 16a provided in the side plate 16, is pushed to the right as viewed in FIG. 4C against the forces of the springs 22 and 24 until the lock lever 21 comes to be locked by the clamp lever 18 as shown in FIG. 4A. The lock lever 23 is thus allowed to come back to its original position to open the switch 74. The springs 13 and 14 then act to bring the outer cover 35 and the holder 31 into a state as shown in FIG. 3A.

As shown in FIGS. 3A, 3B and 3C, a positioning member 43 for cassette 1 is disposed inside the holder 31 at the bottom thereof. The upper wall of the outer cover 35 is preferably provided with some suitable means such as a leaf spring 44 or the like which is arranged to push the cassette 1 against the positioning member 43 in response to the closing action of the outer cover 35 in such a manner as to ensure that the cassette 1 is accurately positioned.

In a possible modification of the cassette and disc loading arrangement described above, the holder 31 may be omitted; and, in place of the holder 31, a frame of a shape suited to the shape of the cassette 1 may be formed as a fixed cassette receiving part within a space in between the hinge shaft 12 of the chassis 11 and the side plate 16 in such a manner as to have the cassette 1 inserted therein. In this case, the upper wall of the outer cover 35 may preferably be provided with some suitable elastic member such as a leaf spring, a sponge member or a soft rubber member which is arranged to push the cassette 1 against the chassis 11 while the outer cover 35 is in a locked state so as to keep it immovable. Further, in this case, the apparatus may preferably be provided with some suitable eject means which is either manually operatable or is arranged to operate in response to the opening movement of the outer cover 35 to eject the cassette 1 from the receiving part of the chassis 11.

Figure 5:
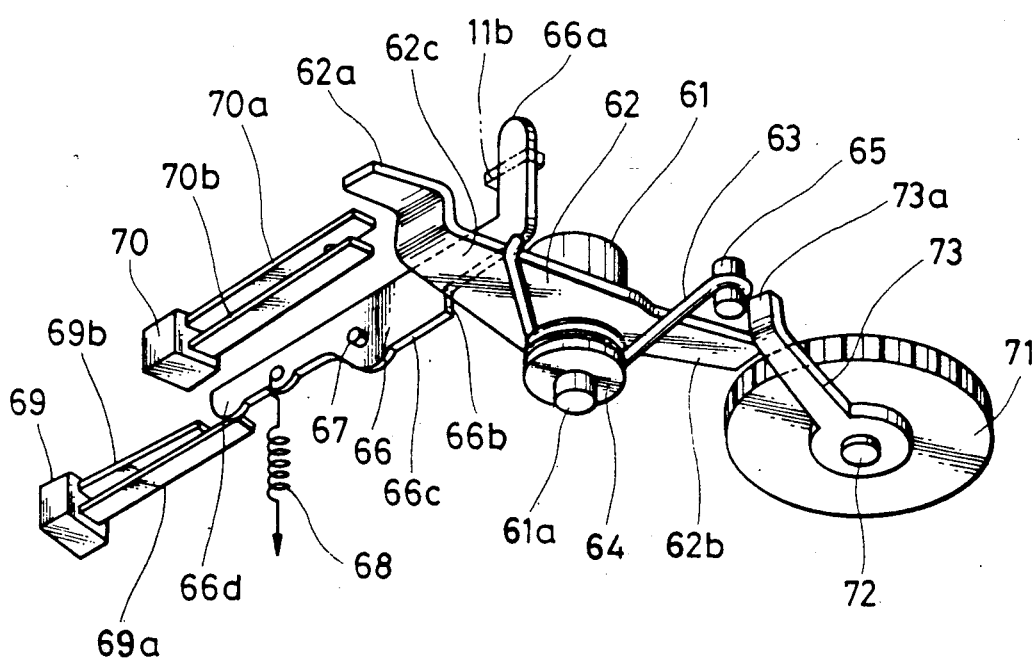
FIG. 5 is a perspective view from below showing a device for detecting and memorizing the exchange or replacement (loading and unloading) of a cassette in the arrangement of FIG.,2.

Further, in a possible modification of the memory means shown in FIG. 5, only the switches 69 and 70 and the gear 71 need be disposed on the side of the body chassis 11. The operating lever 62 and the detection lever 66 may be disposed on the reverse side of the holder 31 while they are arranged in the same manner as in the case of FIG. 5. The cassette sensing piece 66a of the detection lever 66 may be arranged to enter the holder 31 via the aperture 31g of the holder 31. The levers 66 and 62 are thus arranged to operate the switches 69 and 70 when the holder 31 and the outer cover 35 are set in the state of FIGS. 3B or 3C. Also, the reset lever 73 may engage the lever 62 under that condition.

Figure 6:
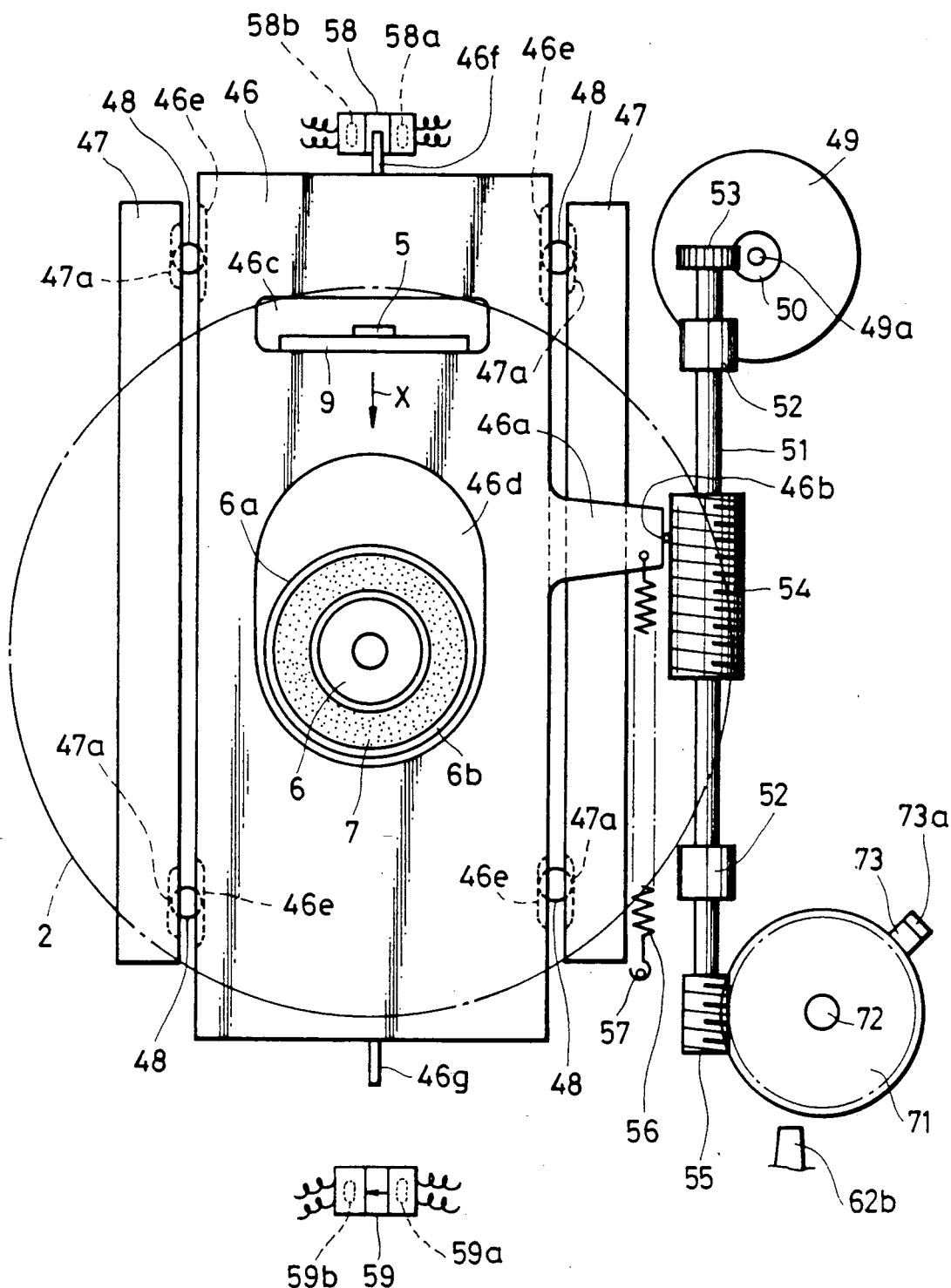
FIG. 6 is a plan view showing particularly a head shifting device used with the cassette holding arrangement of FIG. 2.

The details of the magnetic head shifting device are shown in FIG. 6. The magnetic head 5 is secured to a head carrier 46 at its slot part 46c via a head mount base plate 9. The head carrier 46 is carried via sliding balls 48 by guide rails 47 and is slidable along the guide rails 47. The balls 48 are placed in V-shaped grooves 46e and 47a formed in the side parts of the head carrier 46 and in the guide rails 47. A slot 46d is formed in the head carrier 46 for the purposes of escaping from the spindle 6. An engaging part 46b is arranged at the fore end of an arm part 46a of the head carrier 46 to engage a head shifting screw 54. A backlash removing spring 56 is disposed between the arm part 46a and a fixed pin 57. The spring 56 urges the head carrier 46 in the direction of an arrow X, which is downward as viewed in FIG. 6. This arrangement removes any backlash between the engaging part 46b and the screw 54. The screw 54 is mounted on the middle part of a shaft 51. The shaft 51 is rotatably carried by bearings 52. A worm wheel 53 and a worm gear 55 are mounted on both ends of the shaft 51. The worm wheel 53 engages a worm gear 50 which is mounted on an output shaft 49a of a step motor 49. The worm gear 55 engages the gear 71 which is also shown in FIG. 5.

When the step motor 49 rotates, the rotation is transmitted via the worm gear 50 and the worm wheel 53 to the shaft 51 and thus the screw 54 is rotated. The head carrier 46 is then moved via the engagement of the engaging part 46b thereof and the screw 54 according to the lead of the screw 54. In this case, the moving direction of the carrier 46 is controllable by the rotating direction of the motor 49. The head shifting amount for a unit track pitch on the disc 2 is also controllable by the number of rotation steps to be taken by the motor 49. In this case, the gear 71 is driven to rotate via the worm gear 55.

Detectors 58 and 59 are respectively arranged to detect the deviation of the position of the head 5 from a given recording area on the disc 2 toward the outer side and the inner side of the disc 2. These detectors 58 and 59 are provided with light emitting elements 58a and 59a and light receiving elements 58b and 59b to form known photo-couplers. These photo-coupler type detectors 58 and 59 are thus arranged to detect light shielding plates 46f and 46g which are attached to the carrier 46.

In this embodiment, a total of 50 recording tracks may be formed in a predetermined recording area on the disc 2 at a predetermined track pitch, say, 100 $\mu$m. It is assumed that these tracks are numbered 1 to 50 from the peripheral side toward the center of the disc 2. In this case, the detector 58 is arranged to detect the light shielding plate 46f when the head 5 is shifted to a point located at a one-track pitch distance further toward the peripheral side of the disc 2 from the first track position (hereinafter expediently referred to as the No. 0 track position). On the other hand, the other detector 59 is arranged to detect the light shielding plate 46g when the head 5 is shifted to a point located at a one-track pitch distance from the 50th track position further toward the center of the disc 2 (hereinafter expediently referred to as the 51st track position). The gear 71 is arranged to turn clockwise (counterclockwise in the case of FIG. 5) when the carrier 46 is moved in the direction of arrow X and to turn counterclockwise (clockwise in the case of FIG. 5) when the carrier 46 is moved in opposite direction to the direction of the arrow X. With the gear 71 rotated, the bent-up part 73a of the reset lever 73 comes to push the tail end 62b of the switch operating lever 62 when, for example, the head 5 is shifted to an extent of five track pitches further toward the center of the disc 2 from the 51st track position. Then, the arm part 62c of the lever 62 is disengaged from the pushing-down part 66c of the detection lever 66. Further, the head carrier 46 is arranged to be shifted in the direction of arrow X by the forward rotation of the step motor 49 and in the reverse direction by the reverse rotation of the motor 49.

With the mechanical arrangement of this embodiment as described in the foregoing, the electrical circuit arrangement of this embodiment is next explained herein below with reference to the block diagram of FIG. 7.

Figure 7:
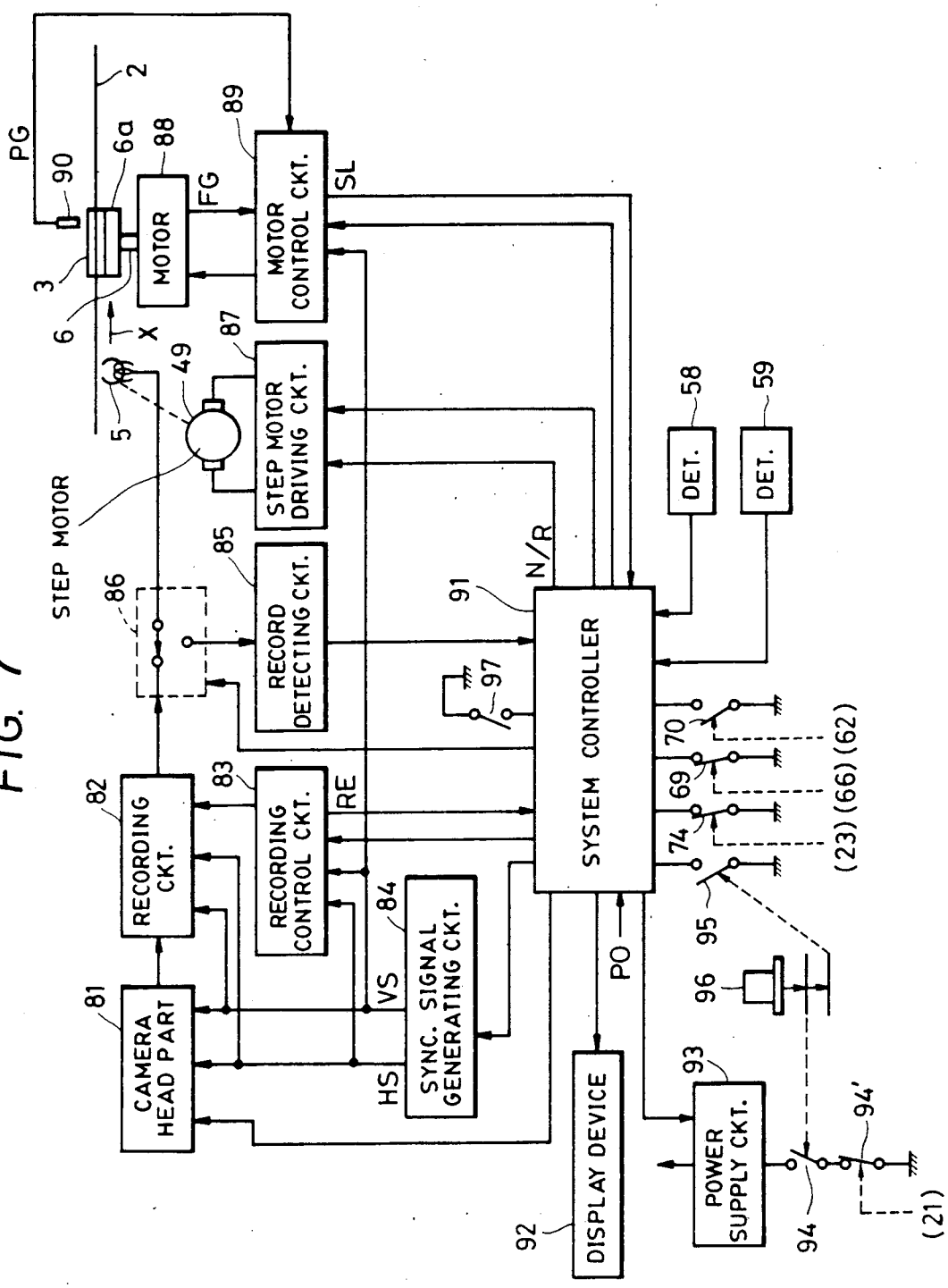
FIG. 7 is a block diagram showing a control arrangement for controlling the head shifting device of FIG. 6 according to the present invention.

FIG. 7 shows by way of example the control arrangement of a still video recording apparatus embodying this invention. As indicated, a camera head part 81 is arranged in a known manner in known video cameras to form a video signal. A recording circuit 82 is arranged to record the video signal coming from the camera head part 81 on the disc 2 through the head 5. A recording control circuit 83 is arranged to cause the recording circuit 82 to record one field or one frame portion of the video signal. A synchronization signal generating circuit 84 is arranged to generate horizontal and vertical synchronization signals HS and VS. The output of the circuit 84 is arranged to be supplied to the camera head part 81, the recording circuit 82, the recording control circuit 83 and a disc motor control circuit 89 which will be described later. Further, the recording control circuit 83 is arranged to produce a recording end signal RE upon completion of recording by the head 5.

A record detecting circuit 85 is arranged to detect through the head 5 whether or not there is a video signal recording at each recording position or track on the disc 2. A change-over switch 86 is arranged to switch the connection with the head 5 between the output terminal of the recording circuit 82 (one terminal R of the switch) and the input terminal of the detecting circuit 85 (another terminal C of the switch).

A step motor driving circuit 87 is arranged to drive the step motor 49 which is used for shifting the head 5 as described above in connection with FIG. 6. A disc rotating motor 88 is arranged to turn the spindle 6 which in turn causes the disc 2 to rotate. A disc motor control circuit 89 is arranged to control the disc rotating motor 88. The motor control circuit 89 includes therein a reference oscillator which produces a reference speed signal. The circuit 89 controls the motor 88 on the basis of the reference speed signal, a rotation speed signal FG obtained from the motor 88, the vertical synchronization signal VS from the synchronization signal generating circuit 84 and a disc rotation phase signal PG obtained from a disc rotation phase detector 90 which detects the magnetizable pin 3e buried in the center core 3 of the disc 2. The motor 88 is thus controlled to rotate the disc 2 at a predetermined speed corresponding either to the field or frame frequency used in a television picture system, i.e. at 3,600 or 1,800 rpm in the case of the NTSC system, and at a predetermined phase relationship relative to the timing of the vertical synchronization signal VS. Further, the control circuit 89 produces a servo-lock-in signal SL when the motor 88 comes to rotate the disc 2 both at the predetermined speed and at the predetermined phase.

A system controller 91 is arranged to control the circuit of FIG. 7 according to the outputs of a recording trigger switch 95, the cassette presence-or-absence detection switch 69, the cassette loading-and-unloading detection switch 70, the outer cover lock completion detecting switch 74, the carrier position detectors 58 and 59, the recording end signal RE from the recording control circuit 83, the servo-lock-in signal SL from the motor control circuit 89, and a power-on signal PO which is produced by a known circuit when the power supply is switched on.

A display device 92 is provided which includes either light emitting or sound producing elements. A power supply circuit 93 is also provided. This circuit includes a battery (not shown). The circuit arrangement of FIG. 7 also includes a series connection of a power supply switch 94 and an emergency power off switch 94'; and it also includes a recording trigger switch 95. In this specific embodiment, a trigger button 96 is arranged to cause the normally open power supply switch 94 to close or turn on when the button 96 is pushed down to a first step and to cause the recording trigger switch 95 to close or turn on when the button 96 is pushed further down to a second step. The trigger button 96 may, if desired, be arranged to be used only for operating the trigger switch 95 while the power supply switch 94 is arranged to be operated by some other member. The normally closed power off switch 94' is arranged to be opened or turned off in relation to the unlock operation of the lock lever 21 to the outer cover 35. A mode change over switch 97 is provided to change over the operation mode of the apparatus between a single mode (a mode where one field or frame portion of the video signal is recorded by each operation of the trigger switch 95) and a continuous mode (a mode where the recording of one field or frame portion of the video signal is successively repeated at a predetermined cycle as long as the trigger switch 95 is kept operated). In this embodiment, the single mode and the continuous mode are respectively designated by turning off and turning on of the switch 97.

In case the recorded signal is an FM signal, the record (presence-or-absence) detecting circuit 85 is arranged to detect the presence or absence of a radio frequency (RF) signal and to produce a high level signal in the event of the presence of the signal.

The system controller 91 is principally composed of a micro-computer, etc. The operation of the system controller 91 is as described below with reference to flow charts. The construction of the system controller 91 is dictated by and is readily obvious to those of ordinary skill in the art of computer design, from the below described operation of the controller.

Figure 8B:
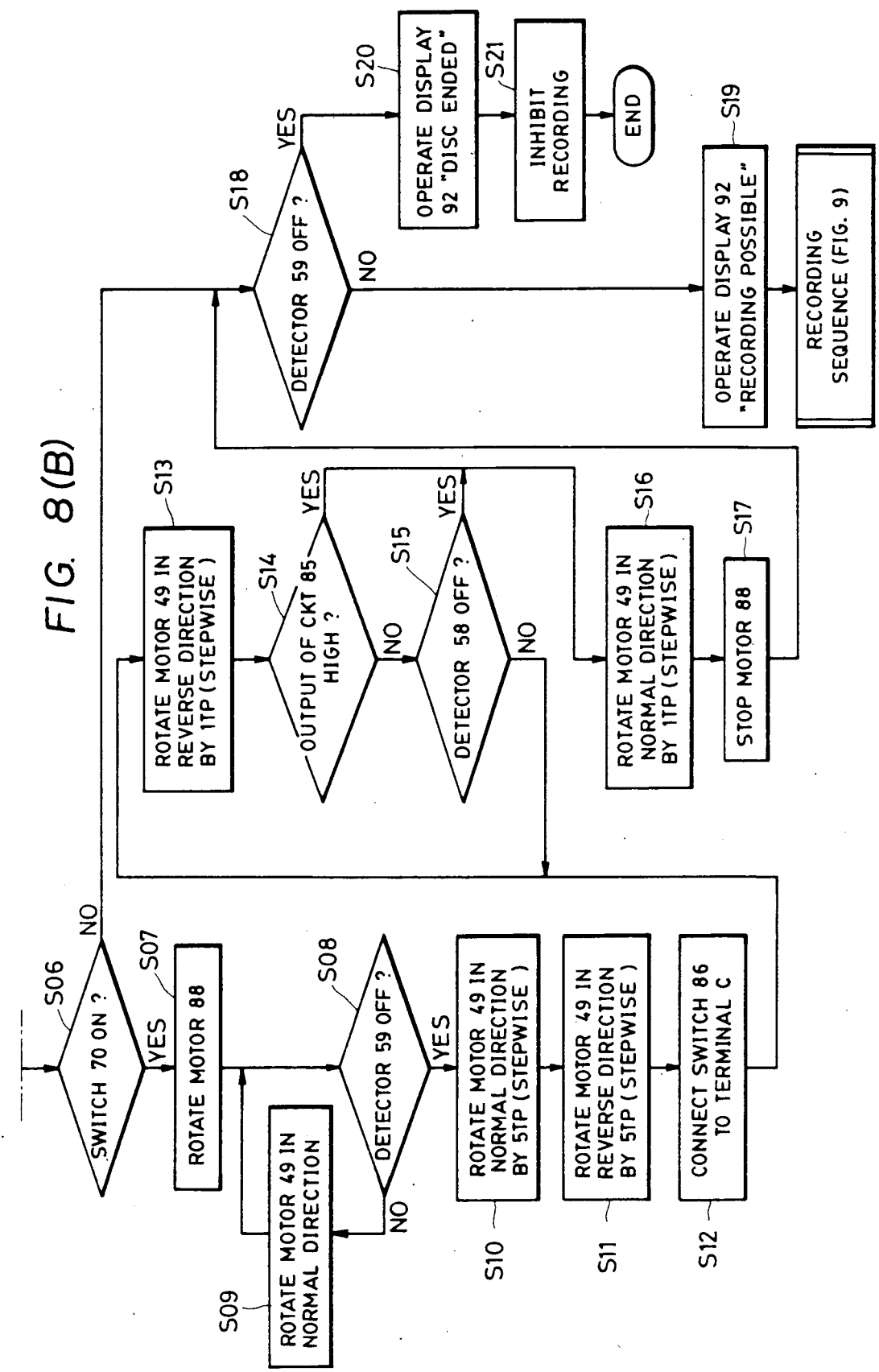

With the trigger button 96 pushed down to its first step to turn on the power supply switch 94 in a condition that the outer over 35 is locked and the power off switch 94' is closed, an operation to make preparations for recording is performed as shown in FIG. 8. With the power supply switched on (step S01), the system controller 91 receives a power-on signal PO from a known power-on-clear circuit (not shown) and clears or resets internal counters, latches etc. Then the controller 91 holds the power on (step S02) and checks the cassette detection switch 69 to find whether it is on (step S03). If the switch 69 is found to be not on, the controller 91 checks the carrier position detector 59 to find whether it is off (step S22). If the detector 59 is found to be not off (turn on of the light receiving element 59b), the controller 91 commands the step motor driving circuit 87 to cause the step motor 49 to rotate in the normal direction (step S23). With the rotation of the motor 49 in the normal direction, the head carrier 46 and thus the head 5 are moved in the direction of the arrow X in FIG. 6. This operation of the motor 49 is maintained until the detector 59 comes to an off condition. Thus the head 5 is brought to a position where the detector 59 becomes off, that is, the 51st track position. Namely, in this embodiment, the starting position for the searching for the recordable position is selected to the head position where the detector 59 becomes off (i.e. corresponding to the 51st track position) and through the steps S22 and S23, the head 5 is set at the starting position for the searching for the recordable position. When the detector 59 becomes off at the step S22, the controller 91 causes the display device 92 to display or warn that the cassette 1 is not loaded (step S24). Then, after lapse of a predetermined time (step S25), the controller 91 releases the holding of the switched on condition of the power supply circuit 93 (step S26).

On the other hand, if the switch 69 is found to be closed (i.e. on) at the step S03, the controller 91 checks the outer cover lock completion switch 74 to find whether it is on (step S04). If the switch 74 is found to be not on, the controller 91 waits until it becomes on. Alternatively, the controller 91 may be arranged to cause the display device 92 to warn of or release the holding of the switched on condition of the power supply circuit 93 (step S05).

On the other hand, if the switch 74 is found to be on at the step S04, the controller 91 checks the cassette loading-and-unloading detection switch 70 to find whether it is closed (i.e. on) (step S05). If this switch 70 is found on, this indicates that the cassette 1 has been exchanged or replaced. In this case, an automatic positioning operation is performed on the head 5 to bring it to an unrecorded location on the disc 2 as follows:

At first, the controller 91 commands the motor control circuit 89 to cause the disc rotation motor 88 to rotate (step S07) in order to prevent the recording surface of the disc 2 from being damaged by the shifting of the head 5 in the stopped or reposed condition of the disc 2. Following that, the controller 91 checks the detector 59 to find whether it is off (step S08); and if it is found not off, the controller 91 commands the step motor driving circuit 87 to cause the step motor 49 to rotate in the normal direction (step S09). Accordingly, the head 5 is shifted toward the center of the disc 2, i.e. in the direction of the arrow X as shown in FIG. 7. Here, if the system has previously completed the steps S22-S26, the detector 59 will already have been turned off at this time. During this head shifting process, the controller 91 repeatedly checks the carrier position detector 59 to find whether it becomes off (i.e. whether its light receiving element 59b is turned off) by the action of the light shielding plate 46g of the carrier 46 as a result of arrival of the head 5 at the 51st track position (at step S08). When the detector 59 turns off, the controller 91 commands the driving circuit 87 to cause the motor 49 to rotate stepwise in the normal direction to shift the head 5 further in the direction of arrow X to the extent corresponding to five track pitches (hereinafter called TP's) (step S10). In response to this, the reset lever 73 of FIG. 5 causes the switch operating lever 62 to turn clockwise as viewed in FIG. 5. The arm part 62c of the lever 62 then disengages from the pushing-down part 66c of the cassette loading-and-unloading detection lever 66. This brings the cassette loading-and-unloading detection switch 70 back to its Off state. On the other hand, the switch operating lever 62 is brought back by the spring 63 to its neutral state in which its arm part 62c can abut on the shoulder 66b of the detection lever 66. After that, therefore, the operating lever 62 abuts on the shoulder part 66b of the detection lever 66 even it is freed from the pressure of the reset lever 73 and thus does not act on the switch 70.

After the step motor 49 has rotated stepwise in the normal direction to the extent corresponding to 5 TP's, the controller 91 commands the driving circuit 87 to cause the motor 49 to rotate stepwise in the reverse direction to shift the head 5 to the extent of 5 TP's in the direction reverse to the arrow X (step S11). As a result, the head 5 is returned to the 51st track position on the disc 2.

Following this, the controller 91 connects the change-over switch 86 to its terminal C (step S12). Under that condition, the controller 91 commands the driving circuit 87 to cause the motor 49 to rotate stepwise in the reverse direction to shift the head 5 to the extent corresponding to 1 TP in the direction reverse to the arrow X (step S13). The head 5 is thus positioned at the 50th track position on the disc 2. Under this condition, the record detecting circuit 85 is connected via the change-over switch 86 to the head 5. The detecting circuit 85, therefore, detects whether there exists any signal previously recorded in the track on the disc 2 (the 50th track on the disc 2, in this case) according to a signal picked up by the head 5. In the event of the presence of any recorded signal there, the circuit 85 produces a high level signal. If no signal is detected there, it keeps its output at a low level. The controller 91 checks the output of the detecting circuit 85 to find whether it is at a high level (step S14). If it is not at the high level, the controller 91 checks the carrier position detector 58 to find whether it is off (step S15). If not, the controller 91 goes back to the step S13 to command the motor 49 to rotate stepwise in the reverse direction to shift the head 5 to the extent corresponding to 1 TP in the direction reverse to the arrow X. In this manner, the processes of the steps S13-S15 are repeated until either the output level of the detector 85 becomes high or the detector 58 turns off. When either the output level of the detection circuit 85 becomes high or the detector 58 turns off, the controller 91 commands to cause the motor 49 to rotate stepwise in the normal direction to shift the head 5 to the extent of 1 TP (step S16). This occurs because the change of the output level of the detection circuit 85 to a high level indicates that the head 5 has reached the last of recorded tracks with these tracks counted in the order of the recording track numbers on the disc 2. Accordingly, when the operation of the controller 91 comes to the step S16 from the step S14, the head 5 positioned at an unrecorded track position located next to the last recorded track. (In other words, in this particular instance, some of the recording tracks on the disc 2 have already been recorded.) On the other hand, turning off of the detector 58 indicates arrival of the head 5 at the No. 0 track position on the disc 2. Therefore, in this case, with the operation coming from the step S15 to the step S16, the head 5 is set at the first track position, that is, this indicates that the disc 2 is a fresh disc and has not been recorded at all.

With the head 5 thus having been set at an unrecorded track position immediately following the last recorded track, the controller 91 commands the disc motor 88 to stop (step S17). The controller 91 then checks the detector 59 to find whether it is off (step S18). If not, the controller 91 causes the display device 92 to display an indication that recording can be performed (or indicating completion of preparations for recording)(step S19). If the detector 59 is found to be off, the controller 91 causes the display device 92 to make a display indicating completion of recording at the 50th track on the disc 2 (disc ended) (step S20), and inhibits the recording (step S21).

At the preceding step S06, if the cassette loading-and-unloading switch 70 is found to be not on, this indicates that the cassette 1 has not been replaced or exchanged. Accordingly the controller 91 goes directly to the step S18.

This embodiment thus makes preparations for recording in the manner as described above.

Figures 9, 9A:
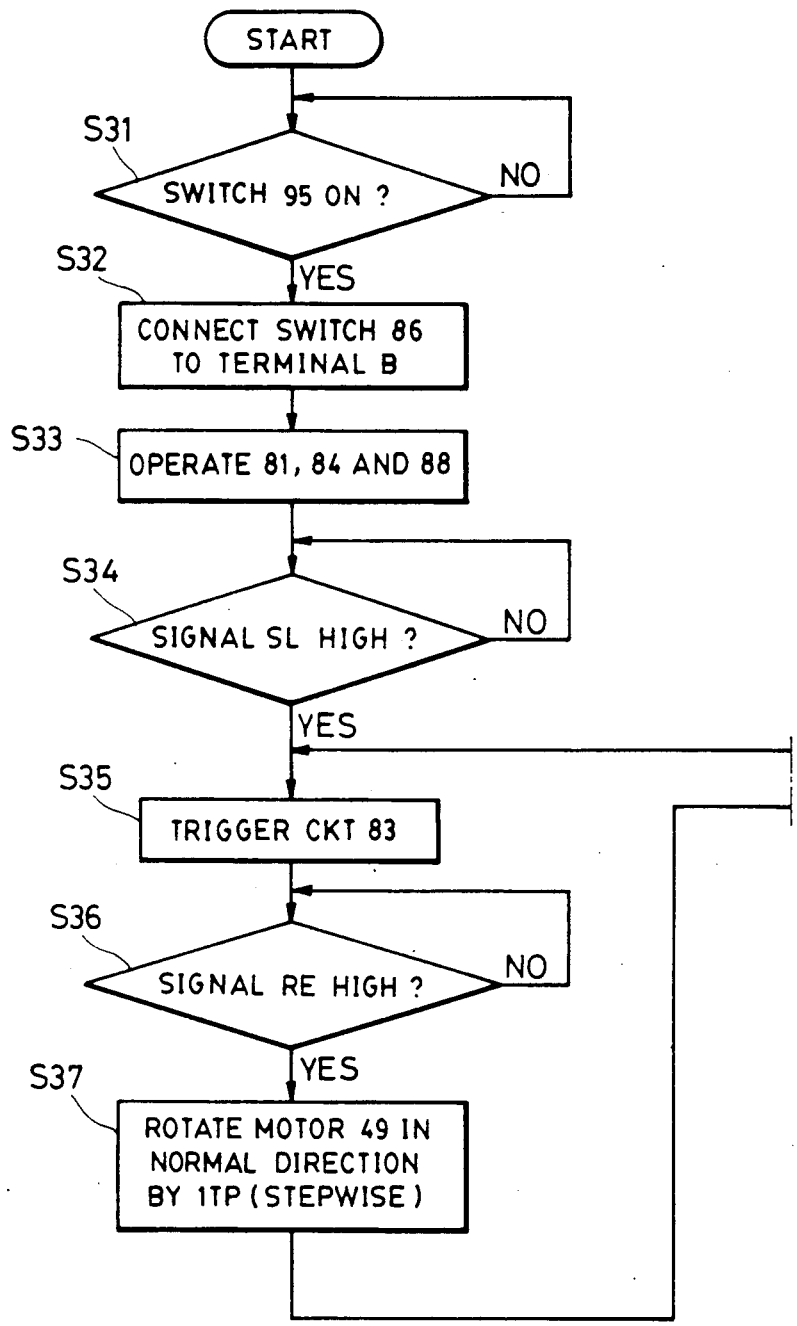
FIG. 9, comprising
FIGS. 9(A) and 9(B), shows a flow chart showing the control flow in carrying out a recording operation.
Figure 9B:
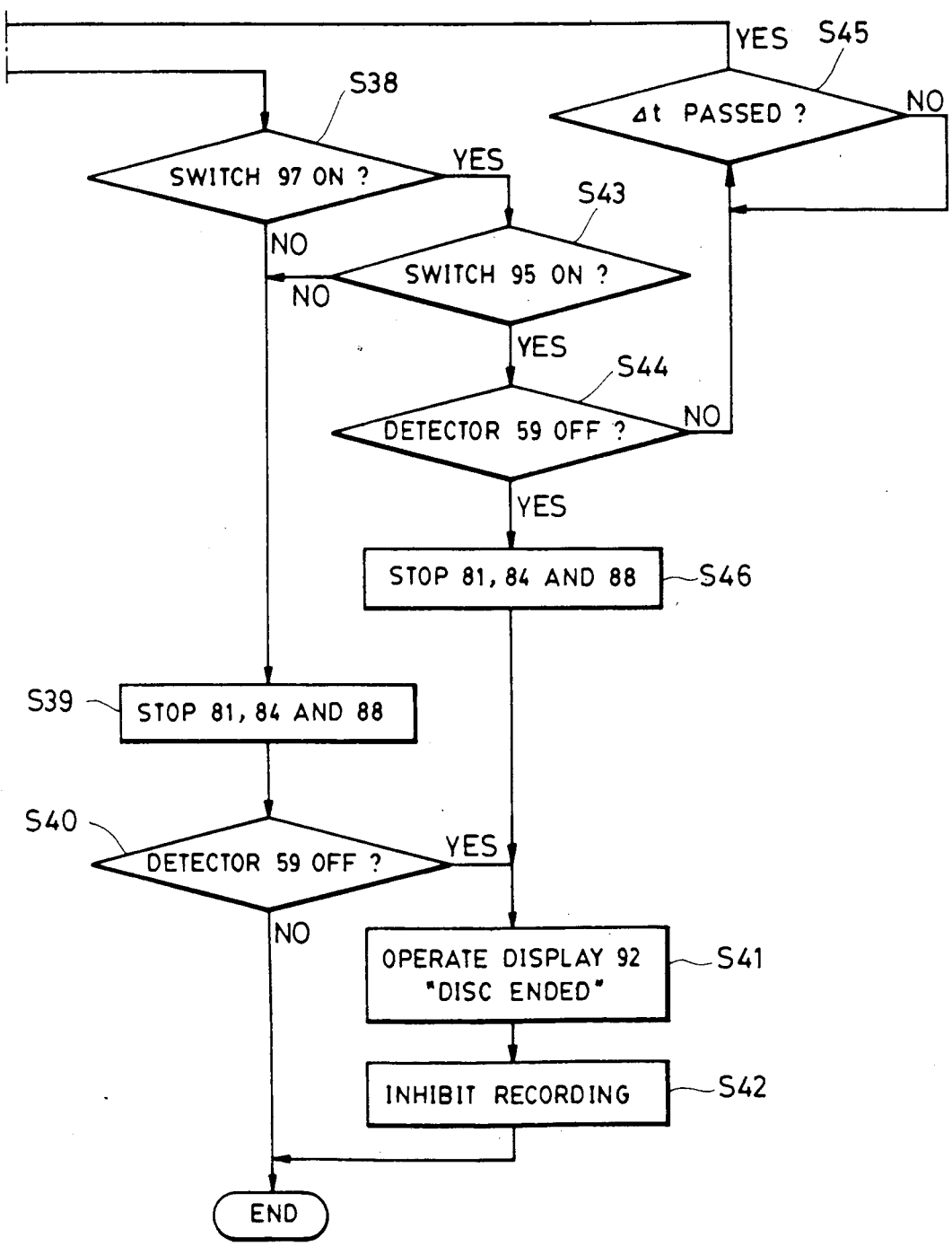

Referring now to FIG. 9, after completion of the preparations for recording, a recording operation of a video signal which is initiated by turning on the recording trigger switch 95 is explained hereinbelow. As long as the power supply is not switched off after completion of the preparations for recording, the system controller 91 checks, in a repeating manner, the recording trigger switch 95 to see if it has been turned on by depression of the trigger button 96 down to its second step (step S31). When the trigger switch 95 is turned on, the controller 91 cause the change-over switch 86 to connect to the terminal R thereof (step S32). Following this, the controller 91 actuates the camera head part 81 and the synchronization signal generating circuit 84 and commands the motor control circuit 89 to turn on the motor 88 (step S33). As a result, the camera head part 81 produces a video signal in synchronism with the synchronization signals HS and VS produced from the synchronization signal generating circuit 84. The recording circuit 82 then processes the video signal produced from the camera head part 81 by performing frequency modulation, etc. to convert it to a recording signal. Under this condition, a recording gate which is included in the recording circuit 82 is in an off state. Therefore, although the recording circuit 82 is connected via the change-over switch 86 to the head 5, no recording is performed under this condition. On the other hand, the motor control circuit 89 controls the rotation of the motor 88 to rotate the disc 2 at a speed corresponding to the field or frame frequency and at a phase in a predetermined relation to the vertical synchronization signal VS. This control is performed on the basis of the speed signal FG from the motor 88, the rotation phase signal PG from the rotation phase detector 90 and the vertical synchronization signal VS from the circuit 84. When the disc 2 comes to rotate at the controlled speed and at the controlled phase, the control circuit 89 makes the servo-lock-in signal SL high. Meanwhile, the controller 91, after producing a command to operate the motor 88, repeatedly checks the servo-lock-in signal SL to see if the level of the signal SL has become high (step S34). When the level of the servo-lock-in signal SL becomes high, the controller 91 immediately triggers the recording control circuit 83 for recording (step S35). Upon receipt of the recording trigger, the circuit 83 causes, on the basis of the synchronization signals HS and VS from the synchronization signal generating circuit 84, the recording gate of the recording circuit 82 to turn on for either one field or one frame period, including the vertical synchronization signal VS first received immediately after receipt of the recording trigger. As a result, a one field or one frame portion of a recording signal is supplied via the change over switch 86 to the head 5. The recording signal is then recorded on the disc 2 while the disc 2 is caused by the motor 88 to make just one turn. In that instance, the recording position of the vertical synchronization signal VS on the disc 2 becomes a predetermined angular position relative to the magnetizable pin 3e of the center core 3. Upon completion of recording of the one field or one frame portion of the recording signal performed in this manner, the recording control circuit 83 changes the level of the recording end signal RE to a high level. Meanwhile, after the recording triggering action, the controller 91 repeatedly checks the recording end signal RE to see whether the level of this signal RE has become high (step S36). When the level of the signal RE becomes high, the controller 91 commands the motor driving circuit 87 to cause the step motor 49 to rotate stepwise in the normal direction to shift the head 5 to a next recording position, that is, to shift it to the extent of 1 TP in the direction of the arrow X (step S37). Following this, the controller 91 checks the mode change-over switch 97 to see whether it is on (step S38). If it is not on (this means that the single mode is designated), the controller 91 stops the camera head part 81 and the synchronization signal generating circuit 84 from operating and commands the motor control circuit 89 to stop the motor 88 (step S39). After this, the controller 91 checks the detector 59 to see if it turned off as a result of the shift of the head 5 (step S40). Upon detection of the off state, the controller 91 causes the display device 92 to indicate completion of recording on the disc 2 (step S41) and inhibits further recording thereon (step S42).

In case that the switch 97 is turned off and accordingly, the single mode is designated, the above-stated processes are repeated every time the trigger switch 95 is turned on to have one field or one frame portion of the signal recorded in each of the tracks on the disc 2 one after another, so long as the detector 59 does not turn off.

On the other hand, if the mode change over switch 97 is found to be on (this means that the continuous mode is designated) at the step S38, the controller 91 checks the trigger switch 95 to see whether it is still on (step S43). If not, the controller 91 goes to the step S39. If the trigger switch 95 is still on, the controller 91 then checks the detector 59 to see whether it is off (step S44). If not, the controller 91 waits for a predetermined time period $\Delta t$ for determining the cycle or rate of the successive recording (step S45) and then goes back to the step S35. If the detector 59 is found to be off at the step S44, the controller 91 stops the camera head part 81 and the synchronization signal generating circuit 84 from operating and commands the motor control circuit 89 to stop the motor 88 (step S46) just the same as in the step S39. Then, the controller 91 goes to the step S41.

In case that switch 97 is turned on and accordingly, the continuous mode is designated, the above-stated processes are repeated as long as the trigger switch 95 is kept on to have one field or one frame portion of the signal recorded in each of the tracks on the disc 2 successively at the predetermined cycle or rate, until the detector 59 turns off.

Here, the cycle or rate of the successive recording can be changed by varying the waiting time $\Delta t$ at the step S45.

Next, some modifications of the above-described embodiment are explained herein below. In the above embodiment, the switch operating lever 62 is reset, i.e. the memory means is reset, when the head 5 is to be shifted from the 51st track position to an extent of 5 TP's toward the center of the disc 2. After that, the head 5 is set at an unrecorded track position which is first found unrecorded through a checking operation performed on the recording tracks one after another in the reverse order of the track numbers (in the direction reverse to the arrow X of FIG. 7) for finding the presence or absence of a previous record. In a possible modification, however, the operating lever 62 may be reset when the head 5 is to be shifted from the No. 0 track position to a predetermined extent further toward the periphery of the disc 2. After that, the head 5 may be set at a first unrecorded track position found by a checking operation performed for finding the presence or absence of previous record in the order of the track numbers (or in the direction of arrow X of FIG. 7, instead of the direction reverse to the arrow X).

For this modification, the gear 71 in FIG. 6 is arranged to be rotated clockwise by the movement of the carrier 46 in the direction reverse to the arrow X. Then, while the head 5 is being shifted from the No. 0 track position to the extent of 5 TP's, for example, in the direction reverse to the arrow X, the reset lever 73 pushes the tail end 62b of the operating lever 62 to cause the lever 62 to turn clockwise as viewed on FIG. 5.

Figure 10B:
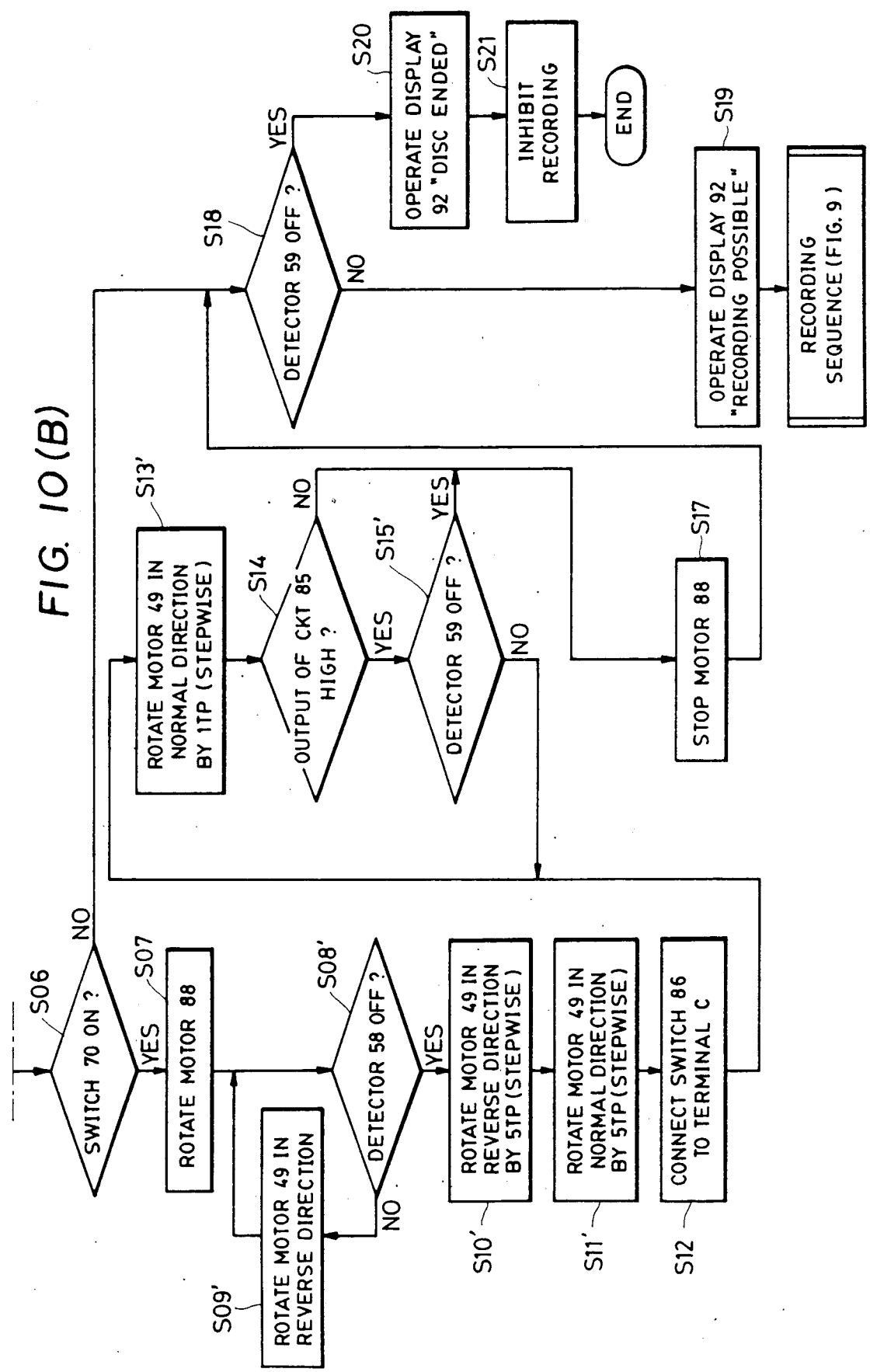

Further, in this case, the control operation of the system controller 91 of FIG. 7 to be performed in preparation for recording may be as shown in the flow chart of FIG. 10. In FIG. 10, the same processes as shown in FIG. 8 are indicated by the same step numbers; and processes which are not exactly the same as shown in FIG. 8 but which correspond to them are indicated by the same step numbers primed. The following description involves only the processes of the control operation of the system controller 91 which differ from those shown in FIG. 8. When the cassette loading-and-unloading detection switch 70 is found on at the step S06, the controller 91 commands the motor 88 to rotate (step S07). Following that, the controller 91 checks the carrier position detector 58 to find whether it is off (step S08'); and if it is found to be not off, the controller 91 commands the step motor 49 to rotate in the reverse direction (step S09') so as to shift the head 5 in the direction reverse to the arrow X.

In the meantime, the controller 91 repetitively checks the detector 58 to see if it has turned off (step S08'). When the detector 58 turns off, the controller 91 stops the commanding of the rotation of the motor 49. Accordingly, the head 5 is set at the No. 0 track position. After this, the controller 91 commands the stepper motor 49 to rotate stepwise in the reverse direction to further shift the head 5 from the No. 0 track position to the extent of 5 TP's in the direction reverse to the arrow X (at a step S10'). By this, the operating lever 62 has its tail end 62b pushed by the bent up part 73a of the reset lever 73 and is thus caused to turn clockwise to be reset. The controller 91 then commands the motor 49 to rotate stepwise in the normal or forward direction to shift the head 5 back to the No. 0 track position by moving it in the direction of the arrow X (at a step S11'). Following that, the controller 91 connects the change over switch 86 to the terminal C (step S12). The controller 91 then commands the motor 49 to rotate stepwise in the normal direction to shift the head 5 in the direction of the arrow X to the extent of 1 TP (step S13'). With the head 5 thus shifted to the new position (the first track position in this instance), the track is checked for presence or absence of any previous record. In other words, the controller 91 checks the output level of the detection circuit 85 to see if it is high (step S14). If it is found to be high, the controller 91 checks the detector 59 to see if it is off (step S15'). If it is found to be not off, the controller 91 goes back to the step S13'. After that, the same processes are repeated until the output level of the circuit 85 is found to be not high. Then, at that point of time, the controller 91 commands the motor 88 to stop (step S17). The head 5 is thus set at the track which is first found to be unrecorded by the record checking process performed on the recording tracks one after another in the order of the recording track numbers. It will be noted that if the switch 69 is found to be off at the step S03, the controller 91 checks the detector 58 to find whether it is off (step S22'). If it is found to be not off, the controller 91 commands the step motor 49 to rotate in the reverse direction (step S23') until the detector 58 becomes off. Except for this, the rest of the operations, including the recording control, are performed in exactly the same manner as in the case of the preceding embodiment.

Further to the foregoing modification the memory means shown in FIG. 5 may be changed by arranging the cassette loading-and-unloading detection lever to detect the loading and unloading of the cassette 1 by detecting the opening action of the holder 31 or that of the outer cover 35 (the condition as shown in FIG. 3A) instead of detecting the presence of the cassette 1 within the holder 31. In the case of the former, the aperture 31g of the holder 31 is closed and the sensor piece 66a of the lever 66 may be arranged to detect the bottom surface of the holder 31. In the case of the latter, the sensor piece 66a may be arranged to detect the edge of the outer cover 35 or the hook 40 (see FIG. 2). However, in either case, the function of the cassette presence-or-absence detection switch 69 would be affected without some modification. Therefore, the switch 69 should be modified to be of a normally open type and to be operative independently of the detection lever 66. A detection pin or the like is secured to the upper contact piece (corresponds to 69b) of the switch 69 and is arranged to be capable of entering the holder 31 through an opening in the upper surface of the chassis 11 and an opening provided in the lower side of the holder 31. With the holder 31 and the outer cover 35 closed, this pin is thus arranged to be pushed to bring the contact pieces (69b and 69a) of the switch 69 into contact with each other only when the cassette 1 is present within the holder 31.

Another embodiment of the present invention will now be explained.

Figure 11:
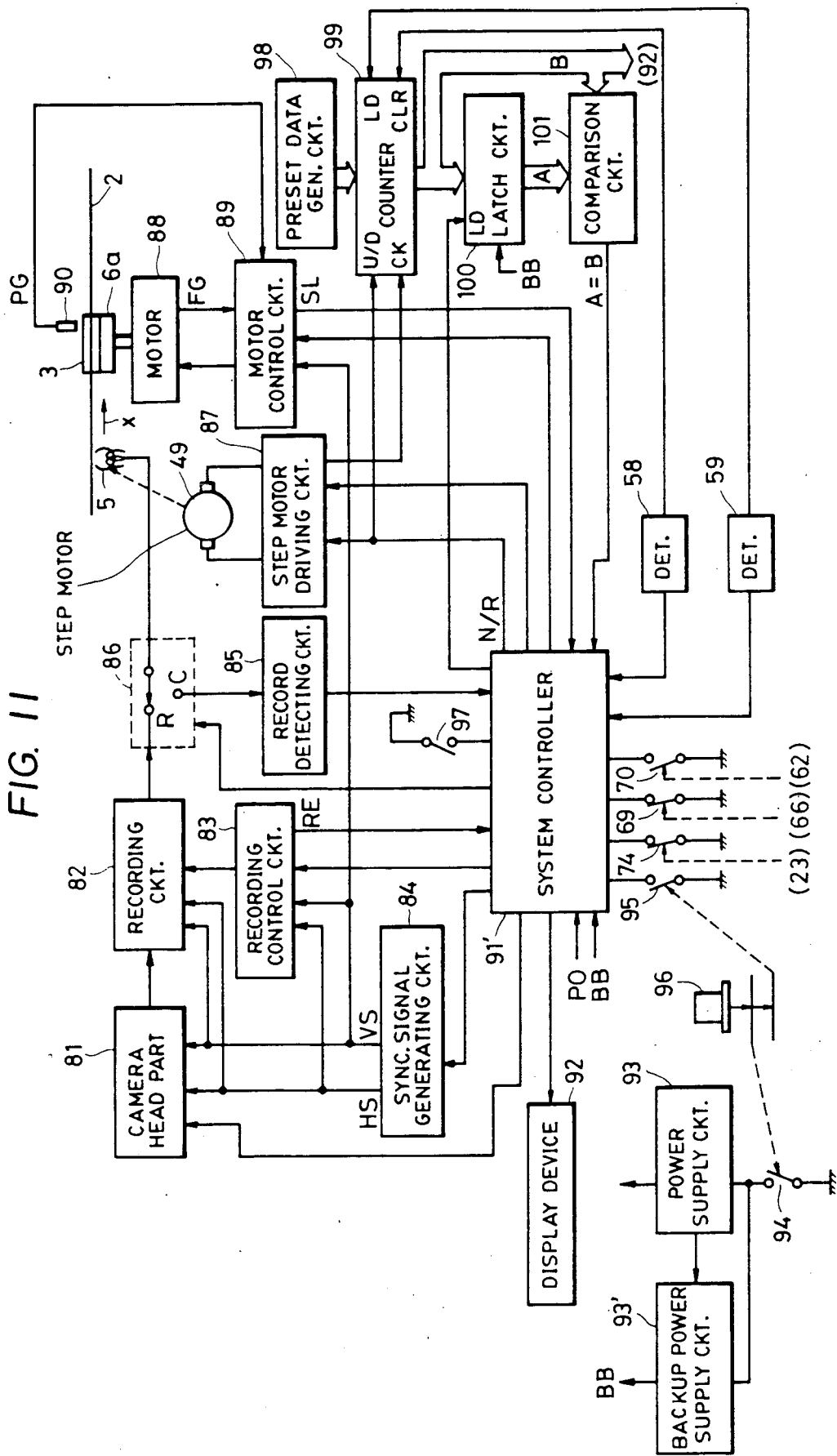
FIG. 11 is a block diagram showing an electrical circuit of a control arrangement in another embodiment of the present invention.

Referring to FIG. 11, a system controller 91' has the same or similar structure and control function as the system controller 91 in FIG. 7. A preset data generating circuit 98 generates a predetermined binary numerical data representing "51". A presettable up and down counter 99 counts the drive pulses produced by the step motor driving circuit 87. The counter 99 is set by the control signal from the controller 91' at an up count mode and a down count mode respectively in correspondence to the rotation of the step motor 49 in the normal direction (shifting of the head in the direction of the arrow X) and in the reverse direction (shifting of the head in the direction reverse to the arrow X). Furthermore, the counter 99 is cleared in response to the turning off of the carrier position detector 58 while preset with the output of the data generating circuit 98 in response to the turning off of the carrier position detector 59. A latch circuit 100 stores the output of the counter 99 in response to a load command from the controller 91'. A comparison circuit 101 compares the output A of the latch circuit 100 and the output B of the counter 99 and its A=B output is supplied to the controller 91'. A backup power supply circuit 93' includes, for example, a capacitor or other electrical power storage means; and is charged with electrical power from the main power supply circuit 93 when the power switch 94 is closed. This backup power supply circuit 93' supplies the stored power to the necessary circuits such as the controller 91', the latch circuit 100 etc. for a certain period of time (scores of minutes or several hours) in case the main power supply fails.

Here, the latch circuit 100 constitutes a memory means for storing the search result of the presence or absence of a recording on the disc 2.

In this embodiment, the head 5 is arranged to be shifted 1 TP by one step rotation of the step motor 49 and the reset lever 73 on the gear 71 shown in FIGS. 5 and 6 is arranged to reset the levers 62 and 66 when the head 5 is moved further from the No. 0 track position toward the periphery of the disc 2 by a few TP's.

Other than the above, the structure is the same as that of the first embodiment.

Next, the operation of the apparatus having the structure described above will be explained with reference to FIG. 12.

Figure 12A:
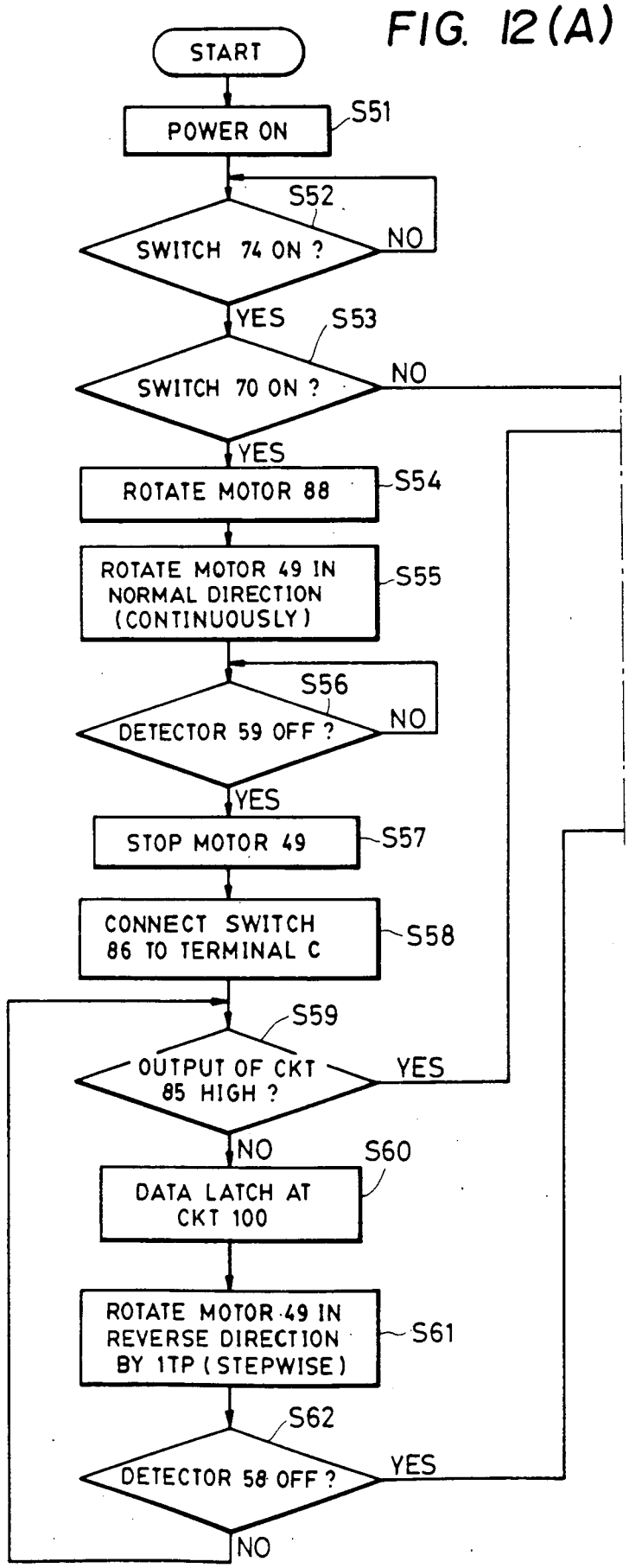

With the trigger button 96 pushed down to its first step to turn on the power supply switch 94, an operation to make preparations for recording is performed as shown in FIG. 12. With the power supply switched on (step 51), the system controller 91' is cleared off by the power up clear circuit (not shown). Then the controller 91' checks the outer cover lock completion detecting switch 74 to find whether it is on (step 52). If it is found to be not on as yet, the controller 91' waits until it turns on. If it is found to be on, the controller 91' then checks the cassette loading and unloading detection switch 70 to find whether it is on (step 53). If this switch 70 is found to be on, it indicates that the cassette 1 has been exchanged or replaced. In this case, an automatic positioning operation is performed on the head 5 to bring it to an unrecorded part of the disc 2.

If the head 5 were shifted while the disc 2 is in repose, the recording surface of the disc 2 would be damaged. To prevent this, the controller 91' commands the disc motor control circuit 89 to start the motor 88. The motor 88 is thus caused to rotate (step 54). Following that, the controller 91' commands the step motor driving circuit 87 to cause the step motor 49 to continuously rotate in the normal direction (step S55). As a result of this, the head 5 is continuously shifted toward the center part of the disc 2, i.e. in the direction of the arrow X as shown in FIG. 11. During this process, the controller 91' checks, in a repeating manner, the carrier position detector 59 to find whether it is turned off by the light shielding plate 46g of the carrier 46 (see FIG. 6) as a result of arrival of the head 5 at the 51st track position (step 56). When the detector 59 is turned off, the controller 91' commands the circuit 87 to stop the motor 49 (step S57). At this time, the counter 99 is preset with the output of the preset data generating circuit 98; and its content becomes "51".

Following this, the controller 91 causes the changeover switch 86 to connect to its terminal C (step S58) and checks the output of the detecting circuit 85 to find whether it is high (step S59). If it is found to be not high, the controller 91' causes the latch circuit 100 to store the output of the counter 99 (step S60) and then commands the circuit 87 to cause the motor 49 to rotate in the reverse direction to the extent corresponding to 1 TP (step S61). Then the controller 91' checks the position detector 58 to find whether it has become off (step S62). If it is found to be not off, the controller 91' goes back to the step S59. Thus, the sequence of the steps S59 to S62 is repeated until the output of the detecting circuit 85 becomes high at the step S59 or the detector 58 becomes off at the step S62 as a result of arrival of the head 5 at the No. 0 track position. Here, the counter 99 counts down by one each time when the motor 49 is rotated by one step in the reverse direction and accordingly the head is shifted by 1 TP in the direction reverse to the arrow X.

During the repetition of the sequence of the steps S59 to S62, if the output of the detecting circuit 85 becomes high at the step S59, the controller 91' commands the driving circuit 87 to cause the motor 49 to rotate continuously in the reverse direction (step S63); and repeatedly checks the detector 58 to find whether it has become off (step S64). If it is found to be off, the controller 91' commands the circuit 89 to stop the motor 49 (step S65). Thus the head 5 is set at the No. 0 track position and the content of the counter 99 is cleared to "0". On the other hand, the latch circuit 100 stores the data representing the number of the unrecorded track next to the last recorded track in the order of the track number from the No. 0 track.

After the step S65, the controller 91' commands the driving circuit 87 to rotate the motor 49 in the reverse direction by few TP's at a step S66. On the other hand, if the detector 58 becomes off at the step S62, the controller 91' comes directly to the step S66 without passing the steps S63 to S65. In this latter case, the content of the latch circuit 100 is "1". The content of the counter 99 is also cleared off to "0".

In case the 50th track is a recorded track, the controller 91' goes to the step S63 after one cycle of the steps S59→S60→S61→S62→S59 and accordingly the content of the latch circuit 100, at this time, is "51".

At the step S66, the controller 91' commands the driving circuit 87 to rotate the motor 49 stepwise in the reverse direction to shift the head 5 further in the direction reverse to the arrow X to the extent corresponding to few TP's. In response to this, the reset lever 73 of FIG. 5 causes the switch operating lever 62 to turn clockwise as viewed in FIG. 5. The arm part 62c of the lever 62 then disengages from the pushing-down part 66c of the cassette loading-and-unloading detection lever 66. This brings the cassette loading-and-unloading detection switch 70 back to its off state. Meanwhile, the spring 63 acts on the switch operating lever 62 to bring it back to its neutral state in which its arm part 62c can abut on the shoulder part 66b of the detection lever 66. After that, therefore, the operating lever 62 abuts on the shoulder part 66b of the detection lever 66 even it is freed from the pressure of the reset lever 73 and thus does not act on the switch 70.

After causing the step motor 49 to rotate in the reverse direction to the extent corresponding to a few TP's, the controller 91' commands the driving circuit 87 to continuously rotate the motor 49 in the normal direction to shift the head 5 in the direction of the arrow X (step S67) and repeatedly checks the A=B output of the comparison circuit 101 to find whether it has become high (step S68). In response to each one step rotation of the motor 49 in the normal direction, the counter 99 counts up by one from "0" and its content indicates the position of the head 5 on the disc 2 and accordingly the track position thereof. The comparison circuit 101 makes its A=B output high when the output B of the counter 99 coincides with the output A of the latch circuit 100. When the A=B output of the comparison circuit 101 becomes high at the step S68, the controller 91' commands the circuits 87 and 89 to stop the motors 49 and 88, respectively (steps S69 and S70). Thus, the head 5 is set at the track position indicated by the output of the latch circuit 100, that is, the unrecorded track next to the last recorded track in the order of the track number from the No. 0 track.

Then the control 91' checks the detector 59 to find whether it is off (step S71). If it is found to be not off, the controller 91' causes the display device 92 to make a display indicating that recording is possible (or preparation for recording is completed) at a step S72. If the detector 59 is found to be off, the controller 91' causes the display device 92 to make a display indicating completion of recording at the 50th track on the disc 2 (disc ended) (step S73) and inhibits the recording (step S74).

At the preceding step 53, if the cassette loading-and-unloading switch 70 is found to be not on, it indicates either that the cassette 1 has not been exchanged or replaced or that the recording apparatus is not loaded with the cassette 1. Such being the case, the controller 91' checks whether the cassette (presence-or-absence) detection switch 69 is on (step S75). In case the switch 69 is on, this means that the cassette 1 has not been exchanged or replaced and the controller 91' goes to the step 71. In case that the switch 69 is found to be not on, this means that the apparatus is not loaded with the cassette 1 (absence of a cassette) and the controller 91' causes the display device 92 to make a display indicating unloading of the cassette 1 (step S76) and inhibits recording (step S74).

This embodiment thus makes preparations for recording in the manner as described above.

The recording operation is performed in the same way as that in the first embodiment, that is, according to the flow chart of FIG. 9. And, during the recording operation, the counter 99 counts up by one each time the head 5 is shifted to the next track after completion of recording at one track and its output indicates the current head position. Thus, the display device 92 may be arranged to display the current head position on the basis of the output of the counter 99.

As is explained above, in this embodiment, if the cassette loading-and-unloading switch 70 is turned on by the exchange or replacement of the cassette 1, the mechanical memory means of FIG. 5 is reset after the information on the recordable position is stored in the latch circuit 100 through the searching of the presence or absence of the record on the disc. Moreover, the latch circuit 100 is supplied with power from the backup power supply circuit 93' after turning off of the main power supply circuit 93. Thus, it becomes possible to avoid the problem where the setting of the head 5 at a recordable position becomes impossible due to power supply trouble in case the mechanical memory means is reset before the searching for a recordable position.

Next, some modifications to the above-described embodiment of FIG. 11 will be explained.

As is mentioned above, the cassette loading-and-unloading detection lever 66 may be arranged to detect the loading and unloading of the cassette 1 by detecting the opening action of the holder 31 or of the outer cover 35 (the condition as shown in FIG. 3A) instead of detecting the presence of the cassette 1 within the holder 31. However, in either case the function of the cassette presence-or-absence detection switch 69 would be affected without some modification. Therefore, the switch 69 should be modified to be of a normally open type and to be operable independently of the detection lever 66 by the cassette 1 only when the cassette 1 is held by the holder 31 in a condition such that the outer cover 35 and the holder 31 are closed. In this case, the system controller 91' may be arranged to perform its control operation in preparation for recording by carrying out step S75 (FIG. 12) between the steps S52 and S53.

Although, in the preceding embodiment, the searching for the recordable position on the disc 2 is performed in the decremental order from the 51st track side (that is, in the direction reverse to the numbering order of the tracks on the disc), this searching may be performed in the incremental order from the No. 0 track side (that is, in the direction of the numbering order of the tracks on the disc).

Figure 13:
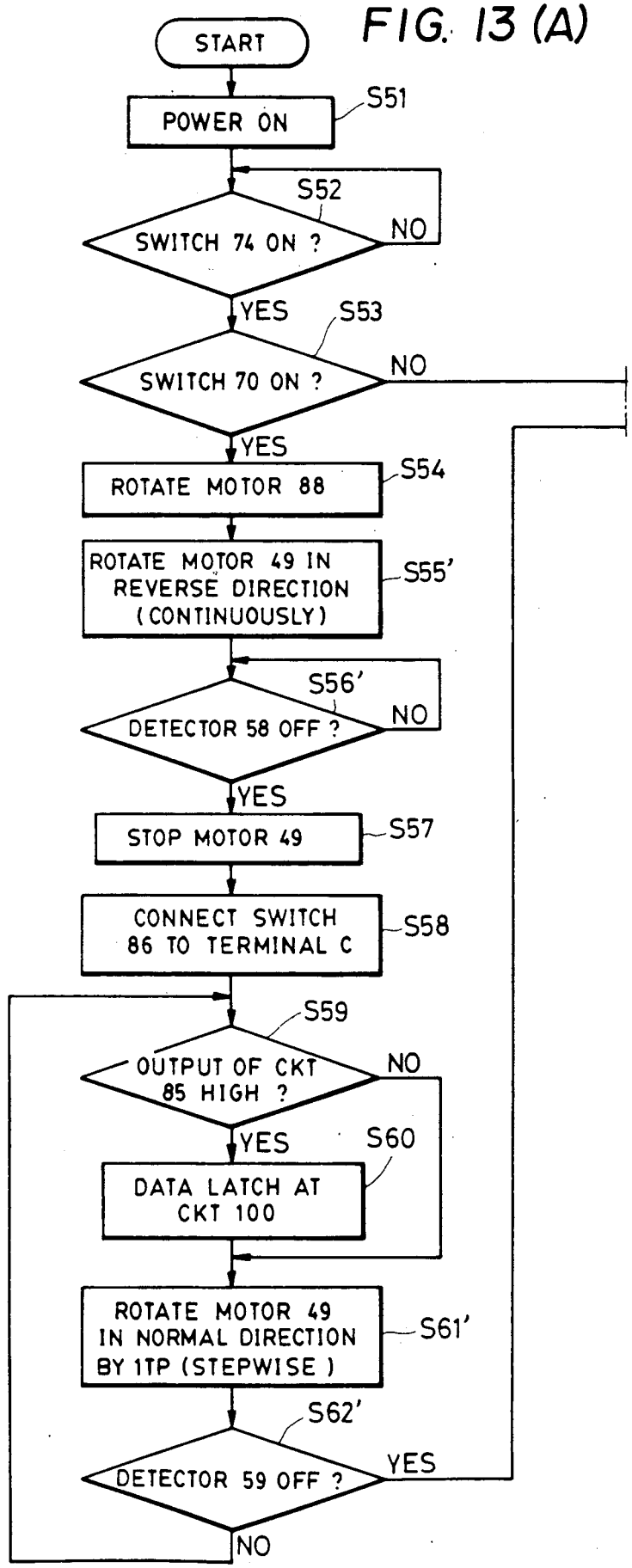
FIG. 13, comprising
Figure 13:
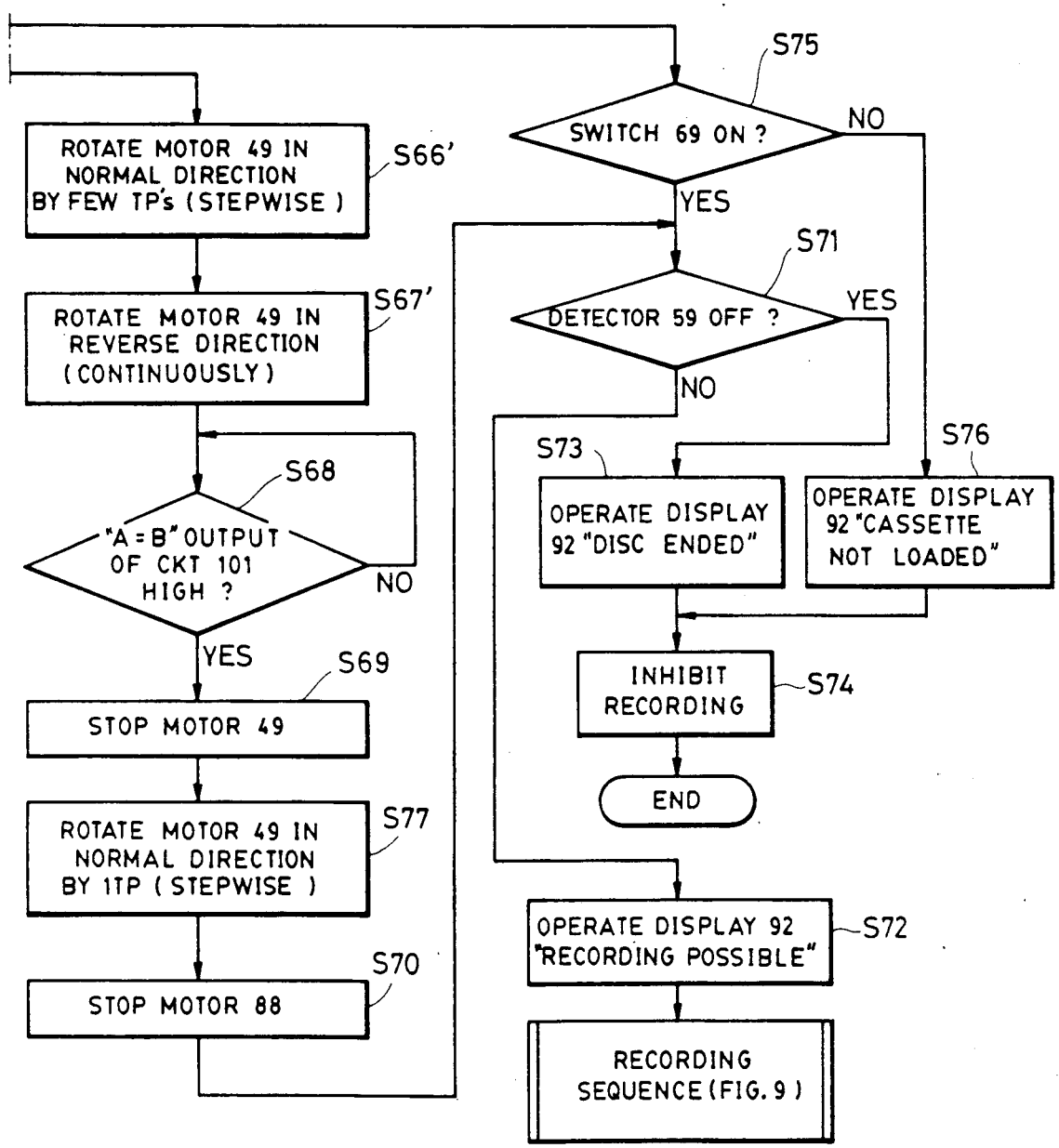
Figure 13:
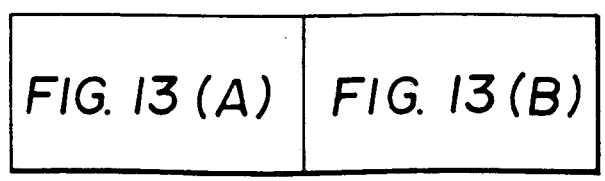

In this case, the data generating circuit 98 may be of no use and an up and down counter may be used for the counter 99. Moreover, the system controller 91' may be arranged to perform a control operation according to the control flow shown in FIG. 13. In FIG. 13, the same processes as those shown in FIG. 12 are indicated by the same step numbers. Meanwhile, processes which are not exactly the same as those shown in FIG. 12 but correspond to them are indicated by the same step numbers primed. The following description mainly covers the processes of the control operation of the system controller 91' which differ from those shown in FIG. 12.

In FIG. 13, after commanding the rotation of the motor 88 at the step S54, the controller 91' commands the continuous rotation of the step motor 49 in the reverse direction until the detector 58 becomes off and causes the motor 49 to stop when the detector 58 becomes off (steps S55', S56' and S57). Thus, the head 5 is set at the No. 0 track position and the counter 99 is cleared. After this, the controller 91' causes the change over switch 86 to connect to the terminal C (step S58) and then checks the output of the detection circuit 85 to see if it is high (step S59). Then, the controller 91' causes the step motor 49 to rotate in the normal direction to the extent corresponding to 1 TP (step S61') after causing the latch circuit 100 to store the output of the counter 99 at the step S60 if the output of the detection circuit 85 is found to be high or directly and without passing the step S60 if the output of the detection circuit 85 is found to be not high. These operations are repeated until the position detector 59 becomes off (step S62'). Thus, when the head 5 reaches the 51st track position, there remains in the latch circuit 100 the number of the last recorded track.

When the detector 59 becomes off at the step S62', the controller 91' causes the motor 49 to further rotate in the normal direction to the extent of few TP's (step S66'). This operation is for resetting the mechanical memory means of FIG. 5. In this modification, the gear 71 is rotated counterclockwise in FIG. 5 (clockwise in FIG. 6) by rotation of the motor 49 in the normal direction (the shifting of the carrier 49 in the normal direction of the arrow X) and rotated clockwise in FIG. 5 (counterclockwise in FIG. 6) by rotation of the motor 49 in the reverse direction (the shifting of the carrier 46 in the direction reverse to the arrow X). Moreover, the reset lever 73 is arranged to reset the level 62 when the head 5 is shifted further toward the center of the disc 2 from the 51st track position (in the direction of the arrow X).

The controller 91' then commands continuous rotation of the motor 49 in the reverse direction (step S67') and begins to repeatedly check the A=B output of the comparison circuit 101 to find whether it becomes high (step S68). When the A=B output of the circuit 101 is found to be high, the controller 91' causes the motor 49 to stop (step S69). In this instance, the head 5 is set at the last recorded track position. Therefore, the controller 91' commands the further rotation of the motor 49 in the normal direction to the extent corresponding to 1 TP (step S77). Thus, the head 5 is set at the unrecorded track position next to the last recorded track position. The operations after the step S77 are the same as those in FIG. 12 beginning from the step S70.

According to the recording preparation operations of the first embodiment (FIG. 8), the second embodiment (FIG. 12) and its modification (FIG. 13), the head 5 is set at the unrecorded track position next to the last recorded track position in the order of the numbering of tracks on the disc 2. Therefore, even in case the disc 2 is half used and moreover, the signals have been erased from some of the intermediate tracks, the head 5 will never be set at the erased track position. Thus, it becomes possible to avoid the problems which occur when recording signals on the intermediate erased recording tracks: that is, for example, the necessity of checking the presence or absence of the record at each recording position on the disc 2 when the head 5 is to be shifted to the next recording position. Such checking would require an unduly long time for completion of the recording preparation and desired recording opportunities may be lost or a proper continuous or successive recording may become very difficult.

In a further modification, the resetting of the switch operating lever 62 may be performed independently of the shift of the head 5. More specifically, the arrangement of the gear 71 and the reset lever 73 of FIGS. 5 and 6 is replaced with an attraction type solenoid or a rod projecting type plunger which is arranged close to the tail and 62b of the lever 62 to be energized by the controller 91 or 91', for example, in parallel with the step S07 or S17 in FIGS. 8 and 10 or the step S67 or S67' or S70 in FIGS. 12 and 13. In this case, the lever 62 is thus arranged to be caused to turn clockwise as viewed on FIG. 5 by the attraction by the solenoid or the pushing force of the plunger rod. According to this modification, the steps S10 and S11 in FIG. 8, the steps S10' and S11' in FIG. 10, the step S66 in FIG. 12 and the step S66' in FIG. 13 can be omitted.

In the embodiments and modifications thereof described above, the recording tracks on the disc 2 are numbered in the order from the peripheral side of the disc 2 to the central side thereof. However, the numbering order may be reversed to increase from the central side to the peripheral side of the disc 2. In such event, the flows of the operation shown in FIGS. 8 to 10, 12 and 13 would be changed accordingly.

In the foregoing, a still video recording apparatus of the kind having the camera head part 81 arranged in one unified body therewith is described by way of example. However, the camera head part 81 may be separately arranged. Also in the described embodiments, the battery is employed as the power source for the recording apparatus; but the battery may be replaced with a commercial power supply.

The apparatus to which this invention is applicable is not limited to a video signal recording apparatus. This invention is applicable also to apparatus of other kinds arranged to record audio signals or information such as data, etc. Further, the recording method is not limited to magnetic recording; and the record bearing medium is not limited to a disc. The medium may be in a drum shape or a tape shape, such as the tape to be used for an 8-track audio recorder.

As can be readily appreciated from foregoing description, according to a first feature of the present invention, it becomes possible to promptly find a recordable position on the record bearing medium through quick searching when the recording medium has been replaced or exchanged. Also, according to a second feature of the present invention, it becomes possible to properly set the recording head at the recordable position on the medium with the highest possible safety against possible failure of the electrical power supply.

The present invention need not necessarily be restricted to the above described embodiments and their modifications but many other modifications can be made within the scope of the invention claimed in appended claims.

We claim:

1. An apparatus for recording information on exchangeable recording media, the combination of:
    a holder for an exchangeable recording medium;
    a transducing head arranged in transducing relationship with a recording medium held by the holder;
    search means to produce relative movement between said head and a recording medium held by said holder to bring together said head and a recordal position on said medium;
    a detector for detecting the unloading of a recording medium;
    a memory for maintaining, independently of application of power thereto, an indication of a prior unloading of a recording medium;
    control means operative, during the application of power thereto, to place said search means in a beginning of search condition in response to detection of unloading by the detector, and an indication from said memory, and
    reset means for resetting said memory, wherein said reset means is arranged to reset said memory in response to the operation of said search means.

2. Apparatus according to claim 1, wherein said search means includes a detection circuit for detecting a recordable position on the medium and is arranged to align said transducing head and the recordable position on the medium with each other when an output of said memory indicates that the medium has been exchanged.

3. Apparatus according to claim 2, wherein said head is movable; said search means is arranged to move said head relative to the medium; and said control means is arranged to control said search means so that said head is placed at a predetermined position when an output of said detection means indicates that the medium is unloaded.

4. Apparatus according to claim 3, wherein said control means is arranged to cause said search means to place said head at a preparatory position for searching for the recordable position on the medium when the output of said detector indicates that the medium is unloaded.

5. Apparatus according to claim 1, wherein said memory is arranged to mechanically maintain said indication; and said reset means is arranged to mechanically reset said memory.

6. Apparatus according to claim 5, wherein said detector is operatively associated with said memory.

7. An apparatus for recording information on exchangeable recording media, comprising the combination of:
    a holder for an exchangeable recording medium;

a transducing head arranged in transducing relationship with a recording medium held by said holder;

drive means to produce relative movement between said head and a recording medium held by said holder to bring together said head and a recordable position on said medium, said drive means including search means for searching for a recordable position on the medium and being arranged to place said head at the recordable position searched by said search means when a memory signal is received that indicates that the medium has been exchanged;

a detector for detecting the unloading of a recording medium;

a memory for maintaining, independently of application of power thereto, an indication of a prior unloading of a recording medium, and for providing said memory signal indicating that the medium has been exchanged;

control means operative, during the application of power thereto, to cause said drive means to relatively position said transducing head and said recording medium at predetermined relative positions in response to detection of unloading by the detector and an indication from said memory; and reset means for resetting said memory, wherein said reset means is arranged to reset memory in response to a predetermined movement of said head means.

8. Apparatus according to claim 7, wherein said control means is further arranged to cause said drive means to place said head at a preparatory position for searching for the recordable position by said search means when said detector indicates that the medium is unloaded.

9. Apparatus according to claim 8, wherein said control means is arranged to cause said drive means to place said head at a position corresponding to an extremity of a searching range of said search means when said detector indicates that the medium is unloaded.

10. Apparatus according to claim 9, wherein said control, means is further arranged to cause said search means to search for the recordable position from the extremity toward another extremity when the indication from said memory means indicates that the medium has been exchanged.

11. Apparatus according to claim 10, wherein said search means is arranged to move said head from the one toward the other extremity and to determine the recordable position based on an output of said head.

12. Apparatus according to claim 11, wherein said search means is further arranged to operate said head drive means during the searching for the recordable position by said search means.

13. Apparatus according to claim 7, wherein said search means is arranged to operate said head drive means during the searching for the recordable position by said search means.

14. Apparatus according to claim 7, wherein said memory is arranged to mechanically store said indication; and further comprising a reset means arranged to mechanically reset said memory.

15. Apparatus according to the claim 14, wherein said detector is mechanically connected with said memory.

16. An apparatus for recording information on exchangeable recording media, comprising the combination of:

a spindle for rotating an exchangeable recording disc;

a moveable transducing head arranged in transducing relationship with a recording disc driven by the spindle;

a loading mechanism for loading the disc onto said spindle;

drive means to produce relative movement between said head and a recording disc held by said spindle to bring together said head and a recordal position on said disc;

a detector for detecting the unloading of the disc from the spindle;

a memory mechanism for mechanically storing, independently of application of power thereto, an indication of a prior unloading of a recording disc;

control means operative, during the application of power thereto, to cause said drive means to relatively position said head and said disc at predetermined relative positions in response to detection of unloading by the detector, and the indication of prior unloading stored in said mechanical memory; and a reset mechanism for resetting said memory mechanism in response to a predetermined movement of said head, wherein said control means is arranged to control said drive means so that said head is placed at a predetermined position when the output of said detector indicates that the disc is unloaded from said spindle, and wherein said control means includes a detection circuit for detecting a recordable position on the disc and is further arranged to control said drive means so that said head is placed at the recordable position detected by said detection circuit when the output of said memory mechanism indicates that the disc has been exchange.

17. Apparatus according to claim 16, wherein said control means is arranged to cause said drive means to place said head at a preparatory position for searching for the recordable position when said detector indicates that the disc is unloaded from said spindle.

18. Apparatus according to claim 17, wherein said control means is arranged to cause said drive means to place said head at a position corresponding to an extremity of a predetermined range for searching for the recordable position when said detector indicates that the disc is unloaded.

19. Apparatus according to claim 18, wherein said control means is arranged to cause said drive means to move said head from the extremity toward another extremity for the searching of the recordable position by said detection circuit when said memory mechanism indicates that the disc has been exchanged.

20. Apparatus according to claim 19, wherein said detection circuit is arranged to detect the recordable position based on an output of said head.

21. A signal recording apparatus comprising:

(A) search means for searching for a recordable position on a record bearing medium;

(B) first memory means for storing information representing the recordable position searched by said search means;

(C) second memory means for storing information regarding an exchange of the medium;

(D) control means responsive to the information stored in said second memory means to control operation of said search means; and (E) reset means for resetting said second memory means after said first memory means stores the information on the searched recordable position.

22. Apparatus according to Clam 21, wherein said control means is arranged to cause said search means to search for the recordable position on the medium from one toward another extremity of a searching range along a predetermined direction when the information stored in said second memory means indicates that the medium has been exchanged; and wherein said first memory means is arranged to store the information on the recordable position as a result of the searching by said search means.

23. Apparatus according to claim 22, wherein said reset means is arranged to reset said second memory means after the completion of the searching by said search means.

24. Apparatus according to claim 23, wherein said reset means is arranged to reset said second memory means in response to the operation of said search means.

25. Apparatus according to claim 24, wherein said reset means is arranged to reset said second memory means in response to the operation of said search means beyond the other extremity of the searching range.

26. Apparatus according to claim 21, wherein said second memory means is arranged to mechanically store information; and wherein said reset means is arranged to mechanically reset said second memory means.

27. Apparatus according to claim 21, further comprising:
signal transducing head means positionable at each recording position on the medium;
said search means being arranged to search for the recordable position based on an output of said head means.

28. Apparatus according to claim 27, wherein said search means includes a discrimination circuit for discriminating whether a signal is recorded based on the output of said head means.

29. A signal recording apparatus comprising:
(A) movable head means;
(B) moving means for moving said head means along a recording surface of a record bearing medium;
(c) detection means for detecting a recordable position on the medium;
(D) first memory means for storing information on the recordable position detected by said detection means;
(E) second memory means for storing information regarding an exchange of the medium;
(F) control means for controlling the operation of at least one of said moving means and said detection means based on the information stored in said second memory means; and
(G) reset means for resetting said second memory means after first memory means stores the information on the detected recordable position.

30. Apparatus according to claim 29, wherein said control means is arranged to cause said moving means to move said head means from one toward another extremity of a detection range for the detection of the recordable position by said detection means when the information stored in said second memory means indicates that the medium has been exchanged.

31. Apparatus according to claim 30, wherein said control means is further arranged to cause said detection means to operate when said moving means moves said head means from the one toward the other extremity of the detection range.

32. Apparatus according to claim 31, wherein said detection means is arranged to detect the recordable position based on an output of said head means.

33. Apparatus according to claim 32, wherein said detection means includes a discrimination circuit for discriminating whether a signal is recorded based on the output of said head means.

34. Apparatus according to claim 31, wherein said first memory means is arranged to store the information on the recordable position as a result of the detection by said detection means.

35. Apparatus according to claim 34, wherein said reset means is arranged to reset said second memory means after the completion of the detection by said detection means.

36. Apparatus according to claim 35, wherein said reset means is arranged to reset said second memory means in response to the operation of said moving means.

37. Apparatus according to claim 36, wherein said reset means is arranged to reset said second means when said moving means moves said head means beyond the other extremity of the detection range.

38. Apparatus according to claim 37, wherein said second memory means is arranged to mechanically store information; and wherein said reset means is arranged to mechanically reset said second memory means.

39. A disc recording apparatus comprising:
(A) a movable head;
(B) a spindle for rotating a disc relative to said head;
(C) a loading mechanism for loading the disc onto said spindle;
(D) a moving mechanism for moving said head along a recording surface of the disc;
(E) detection means for detecting a recordable position on the disc;
(F) a memory circuit for electrically storing information on the recordable position detected by said detection means;
(G) a memory mechanism for mechanically storing information regarding an exchange of the disc;
(H) control means for controlling the operation of at least one of said moving mechanism and said detection means in response to the information stored in said memory mechanism; and
(I) reset means for resetting said memory mechanism after said memory circuit stores the information regarding the recordable position.

40. Apparatus according to claim 39, wherein said control means is arranged to cause said moving mechanism to move said head from one toward another extremity of a detection range for the detection of the recordable position by said detection means and to cause said detection means to operate when said moving mechanism moves said head from one toward the other extremity.

41. Apparatus according to claim 40, wherein said detection means is arranged to detect the recordable position based on an output of said head; and wherein said memory circuit is arranged to store the information as a result of the detection by said detection means.

42. Apparatus according to claim 41, wherein said reset means is arranged to reset said memory mechanism in response to said moving mechanism.

43. Apparatus according to claim 42, wherein said reset means is arranged to reset said memory mechanism when said moving mechanism moves said head beyond the other extremity of the detection range.

44. A recording apparatus comprising:
means for loading an exchangeable recording medium;
means for supplying electrical power to said apparatus to perform a recording operation;
first detection means for detecting the unloading of the exchangeable recording medium;
a moveable recording head;
second detection means for detecting a position of said movable recording head; and
control means for moving said movable recording head into a predetermined initial recording position, when said first detection means detects the unloading of the exchangeable recording medium, at the start of electrical power supply to the recording apparatus by said supplying means.

45. An apparatus according to claim 44, wherein said loading means includes a holder for said exchangeable recording medium.

46. An apparatus according to claim 44, wherein said supplying means includes a battery.

47. An apparatus according to claim 44, further comprising memory means for memorizing an indication of a prior unloading of the recording medium.

48. An apparatus according to claim 47, wherein said control means moves said movable recording head into the initial recording position while said indication is being memorized by said memory means, even if the unloading of the exchangeable recording medium is not detected by said first detection means.

49. An apparatus according to claim 44, wherein said initial recording position is at a peripheral position on the recording medium.

50. An apparatus according to claim 44, wherein said second detection means includes:
a member moving together with the moving of said movable recording head; and
a detector for detecting a position of said member.

51. A recording apparatus comprising:
a recording head whose access position relative to an exchangeable recording medium is changeable;
means for loading the exchangeable recording medium;
means for supplying an electrical power to said apparatus to perform a recording operation;
first detection means for detecting the unloading of the exchangeable recording medium;
second detection means for detecting the access position of said recording head; and
control means having a first mode for moving said recording head into a predetermined initial recording position when said first detection means detects the unloading of the exchangeable recording medium, and a second mode for not moving said recording head when said first detection means does not detect the unloading of the exchangeable recording medium, at the start of the electrical power supply to the recording apparatus by said supplying means.

52. An apparatus according to claim 51, wherein said loading means includes a holder for said exchangeable recording medium.

53. An apparatus according to claim 51, wherein said supplying means includes a battery.

54. An apparatus according to claim 51, further comprising memory means for memorizing an indication of a prior unloading of the recording medium.

55. An apparatus according to claim 54, wherein said control means moves said movable recording head into the initial recording position while said indication is being memorized by said memory means, even if the unloading of an exchangeable recording medium is not detected by said first detection means.

56. An apparatus according to claim 51, wherein said initial position is at a peripheral extremity position on the medium.

57. An apparatus according to claim 51, wherein said second detection means includes:
a member moving together with the moving of said movable recording head; and
a detector for detecting a position of said member.

58. An apparatus for recording information on exchangeable recording media, comprising:
holder means for holding an exchangeable recording medium;
head means disposed in transducing relationship with the recording medium;
detector means for detecting unloading of a recording medium;
memory means for storing, independently of application of power thereto, an indication of a prior unloading of a recording medium from said holder means;
drive means for producing relative movement between said head means and the recording medium held by said holder means to cause said head means to be disposed at a recordable position of the held recording medium, said drive means including search means for searching the held recording medium for a recordable position, said drive means causing said head to be disposed at the recordable position located by said search means when said memory means stores an indication of a prior unloading of a recording medium from said holder means;
reset means for resetting said memory means; and
control means for causing, during application of power thereto, (1) said drive means to relatively position said head means and the held recording medium at predetermined relative positions when said detector means detects an unloading, and (2) said drive means to relatively position said head means and the held recording medium at the predetermined relative positions when said memory means stores the indication of the prior unloading.

59. An apparatus for recording information on exchangeable recording media, comprising:
spindle means for holding and rotating an exchangeable recording disc;
moveable head means disposed in transducing relationship with the recording disc held by said spindle means;
loading means for loading the recording disc onto said spindle means;
drive means for producing relative movement between said head means and the recording disc held by said spindle means to cause said head means to be disposed at a recordable position of the recording disc held by said spindle means;
detector means for detecting unloading of a recording disc from said spindle means;

memory means for mechanically storing, independently of application of power thereto, an indication of a prior unloading of a recording disc; and control means for causing, during application of power thereto, (1) said drive means to relatively position said head means and the held disc at predetermined relative positions when said detector means detects an unloading, (2) said drive means to relatively position said head means and said disc at the predetermined relative positions when said memory means mechanically stores the indication of the prior unloading, and (3) said drive means to position said head means at a predetermined position when said detector means detects that the disc is unloaded from the spindle means.

* * * * *

UNITED STATES PATENT AND TRADEMARK OFFICE
CERTIFICATE OF CORRECTION

PATENT NO. : 5,051,849

DATED : September 24, 1991

INVENTOR(S) : Nubuo FUKUSHIMA, et al.

It is certified that error appears in the above-identified patent and that said Letters Patent is hereby corrected as shown below:

COLUMN 4:
    Line 65, "be" should be deleted.

COLUMN 5:
    Line 9, "mean" should read --means--; and
    Line 45, "Fig., 2;" should read --Fig.2;--.

COLUMN 6:
    Line 7, "EMBODIMENT" should read --EMBODIMENTS--.

COLUMN 7:
    Line 64, "under side" should read --underside--.

COLUMN 10:
    Line 25, "comes" should read --is--.

COLUMN 15:
    Line 53, "Off" should read --off--.

COLUMN 16:
    Line 40, "positioned" should read --is positioned--.

COLUMN 17:
    Line 55, "change over" should read --change-over--.

COLUMN 18:
    Line 27, "change over" should read --change-over--.

COLUMN 19:
    Line 49, "change over" should read --change-over--.

UNITED STATES PATENT AND TRADEMARK OFFICE
CERTIFICATE OF CORRECTION

PATENT NO. : 5,051,849

DATED : September 24, 1991

INVENTOR(S) : Nubuo FUKUSHIMA, et al.

It is certified that error appears in the above-identified patent and that said Letters Patent is hereby corrected as shown below:

COLUMN 24:

Line 32, "change" should read --change- --;
Line 49, "few" should read --a few--;
Line 54, "carrier 49" chould read --carrier 46--; and
Line 59, "level 62" should read --lever 62--.

COLUMN 25

Line 34, "and" should read --end--.

COLUMN 26:

Line 25, "recordal" should read --recordable--; and
Line 35, "detector," should read --detector--.

COLUMN 27:

Line 42, "control," should read --control--.

UNITED STATES PATENT AND TRADEMARK OFFICE
CERTIFICATE OF CORRECTION

PATENT NO. : 5,051,849

DATED : September 24, 1991

INVENTOR(S) : Nubuo FUKUSHIMA, et al.

It is certified that error appears in the above-identified patent and that said Letters Patent is hereby corrected as shown below:

COLUMN 28:

Line 8, "recordal" should read --recordable--; and
Line 36, "exchange." should read --exchanged.--.

COLUMN 29:

Line 4, "Clam" should read --Claim--.

Signed and Sealed this

Thirteenth Day of July, 1993

Attest:

MICHAEL K. KIRK

Attesting Officer     Acting Commissioner of Patents and Trademarks